US012696044B2

(12) United States Patent
Livingston et al.

(10) Patent No.: US 12,696,044 B2
(45) Date of Patent: Jul. 28, 2026

(54) METHODS AND SYSTEMS FOR AUTOMATICALLY UPDATING LOOK DIRECTIONS OF RADIATION PATTERNS

(71) Applicant: Apple Inc., Cupertino, CA (US)

(72) Inventors: James A. Livingston, Oakland, CA (US); Jack P. Newman, Sunnyvale, CA (US); Frank Baumgarte, Sunnyvale, CA (US); Francois Becker, Antony (FR)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 18/665,492

(22) Filed: May 15, 2024

(65) Prior Publication Data

US 2024/0406658 A1 Dec. 5, 2024

Related U.S. Application Data

(60) Provisional application No. 63/505,965, filed on Jun. 2, 2023.

(51) Int. Cl.
H04S 7/00 (2006.01)
G06F 3/0484 (2022.01)
G10L 19/008 (2013.01)

(52) U.S. Cl.
CPC ............ H04S 7/303 (2013.01); G06F 3/0484 (2013.01); G10L 19/008 (2013.01); H04S 7/40 (2013.01); *H04S 2400/11* (2013.01); *H04S 2420/03* (2013.01)

(58) Field of Classification Search
CPC ........ H04S 7/303; H04S 7/40; H04S 2400/11; H04S 2420/03; G06F 3/0484; G10L 19/008
See application file for complete search history.

(56) References Cited

U.S. PATENT DOCUMENTS

2019/0313200 A1 10/2019 Stein
2021/0287651 A1 9/2021 Eronen et al.
(Continued)

FOREIGN PATENT DOCUMENTS

WO WO-2019121773 A1 * 6/2019 ............. H04S 7/303

OTHER PUBLICATIONS

Dolby, "Dolby Atmos Renderer Documentation", received from https://professionalsupport.dolby.com/s/article/Dolby-Atmos-Renderer-Documentation?language=en_US, Sep. 16, 2021,.
(Continued)

*Primary Examiner* — Andrew Sniezek
(74) *Attorney, Agent, or Firm* — Aikin & Gallant, LLP

(57) ABSTRACT
A method that includes displaying a user interface (UI) of a three-dimensional (3D) acoustic environment that includes a sound source; receiving a user selection, via an input device, of a location within the UI, the location towards which the sound source is to be oriented within the 3D acoustic environment; determining a set of parameters that define an orientation of the sound source towards the location within the 3D acoustic environment; determining that there is motion of the location or the sound source within the 3D acoustic environment; updating, without user intervention and based on the motion, the set of parameters to maintain the orientation of the sound source towards the location.

22 Claims, 17 Drawing Sheets

(56) References Cited

U.S. PATENT DOCUMENTS

2023/0104111 A1      4/2023  Murgai et al.
2023/0133891 A1 *   5/2023  Lu ..................... G06Q 30/0641
                                                    705/26.7

OTHER PUBLICATIONS

Herre et al., "Parametric Coding of Audio Objects: Technology, Performance and Opportunities", received from https://www.aes.org/e-lib/browse.cfm?elib=15969, Jul. 22, 2011, 10 pages.
Herre et al., "MPEG Spatial Audio Object Coding—The ISO/MPEG Standard for Efficient Coding of Interactive Audio Scenes", received from https://www.aes.org/e-lib/browse.cfm?elib=15686, Nov. 4, 2010, pp. 655-673.
L-Acoustics, "L-ISA Studio", received from https://www.l-acoustics.com/products/l-isa-studio/, Apr. 8, 2021, 35 pages.
Adamson, "Fletcher Machine", received from https://adamson-fletcher-machine.com/#downloads, 2022, 10 pages.

* cited by examiner

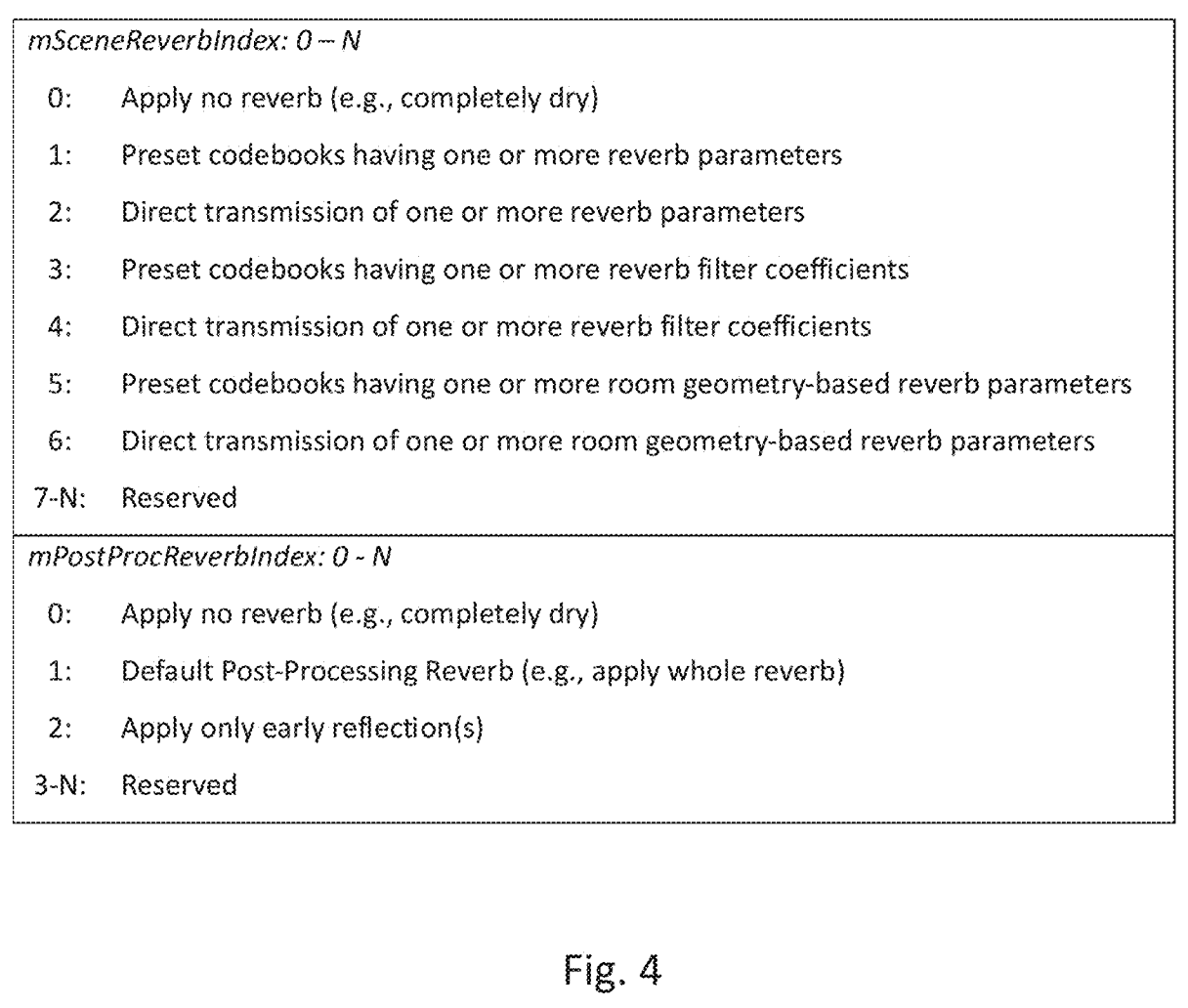

*mSceneReverbIndex: 0 – N*

0:    Apply no reverb (e.g., completely dry)

1:    Preset codebooks having one or more reverb parameters

2:    Direct transmission of one or more reverb parameters

3:    Preset codebooks having one or more reverb filter coefficients

4:    Direct transmission of one or more reverb filter coefficients

5:    Preset codebooks having one or more room geometry-based reverb parameters

6:    Direct transmission of one or more room geometry-based reverb parameters

7-N:    Reserved

*mPostProcReverbIndex: 0 – N*

0:    Apply no reverb (e.g., completely dry)

1:    Default Post-Processing Reverb (e.g., apply whole reverb)

2:    Apply only early reflection(s)

3-N:    Reserved

Fig. 4

Storage of Radiation Patterns

Dictionary

• Each entry in the dictionary contains information for implementation details/information pertaining to directivity characteristics at multiple elevation/azimuth.

• Filter Coefficients,
• HOA Coefficients (per frequency band)
• Directivity Patterns (per frequency band):
  • Shape (Omni, Cardiod, Super-cardiod, dipole, etc)
    • Sharpness
  • Shape Using Cones
    • Inner-angle,
    • Outer-angle,
    • Outer-gain
  • Physically-based Spherical Cap
    • Sphere Radius,
    • Cap Opening Angle

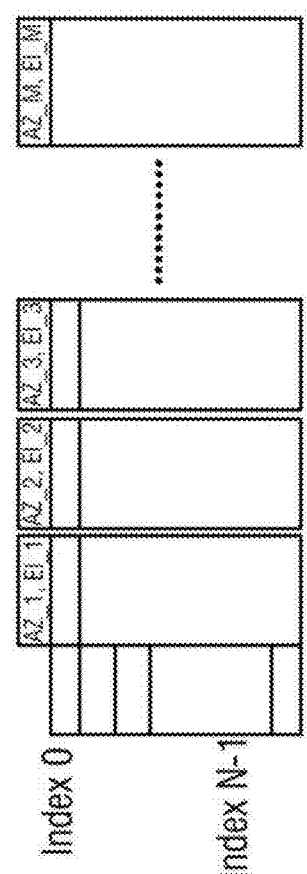

Dictionary of Objects

Index 0

Index N-1

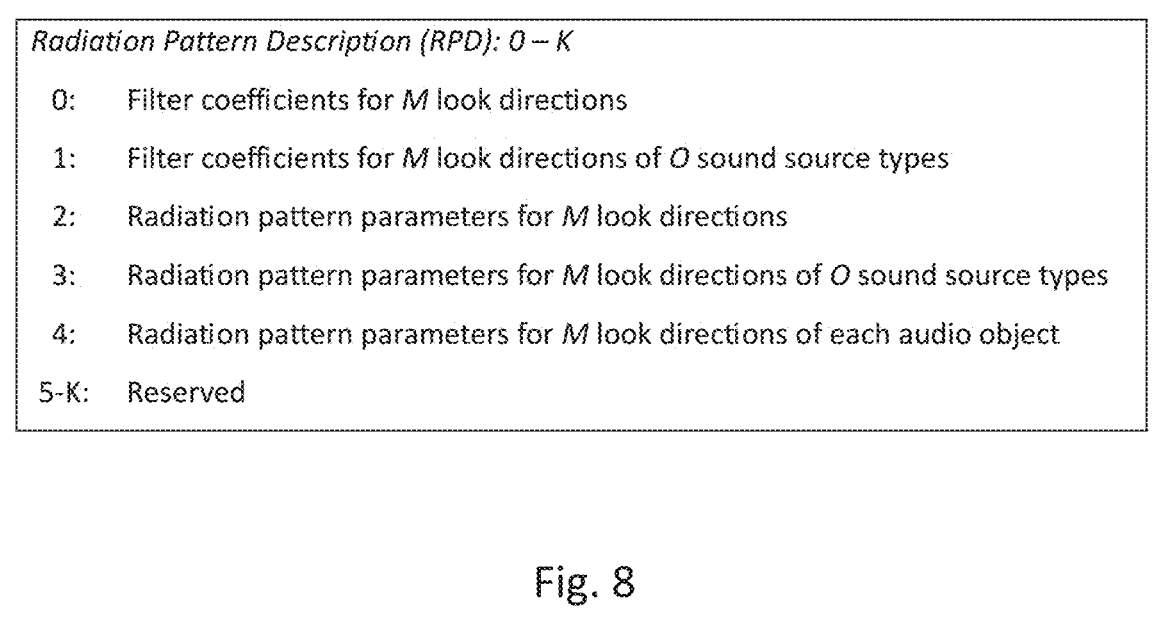

*Radiation Pattern Description (RPD): 0 – K*

0:     Filter coefficients for *M* look directions

1:     Filter coefficients for *M* look directions of *O* sound source types

2:     Radiation pattern parameters for *M* look directions

3:     Radiation pattern parameters for *M* look directions of *O* sound source types 4:     Radiation pattern parameters for *M* look directions of each audio object 5-K:   Reserved

Fig. 8

System
100
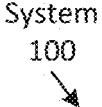
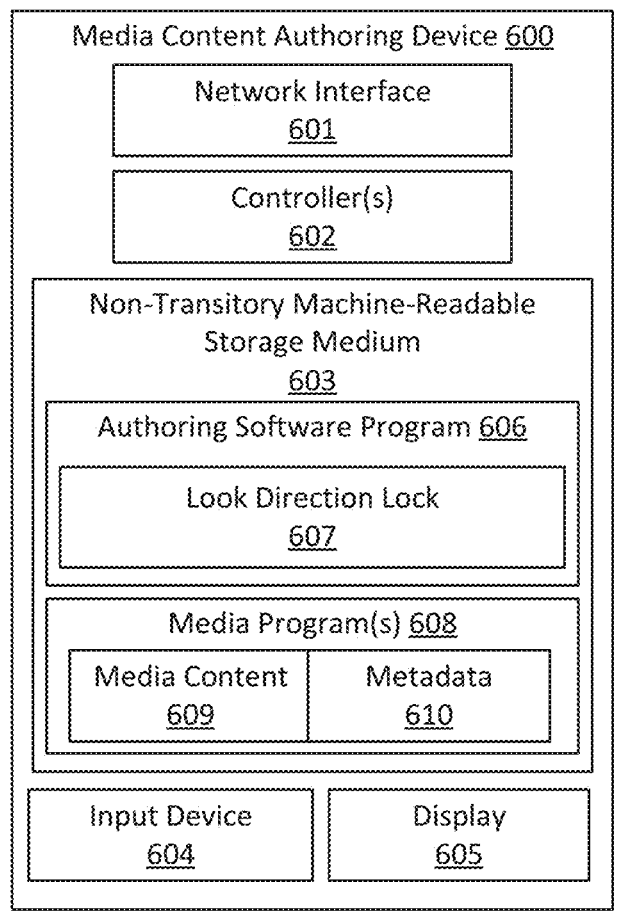
Media Content Authoring Device 600
Network Interface
601
Controller(s)
602
Non-Transitory Machine-Readable
Storage Medium
603
Authoring Software Program 606
Look Direction Lock
607
Media Program(s) 608
| Media Content 609 | Metadata 610 |
|---|---|
| Input Device 604 | Display 605 |
|---|---|
Fig. 10

Process
160

Process
170

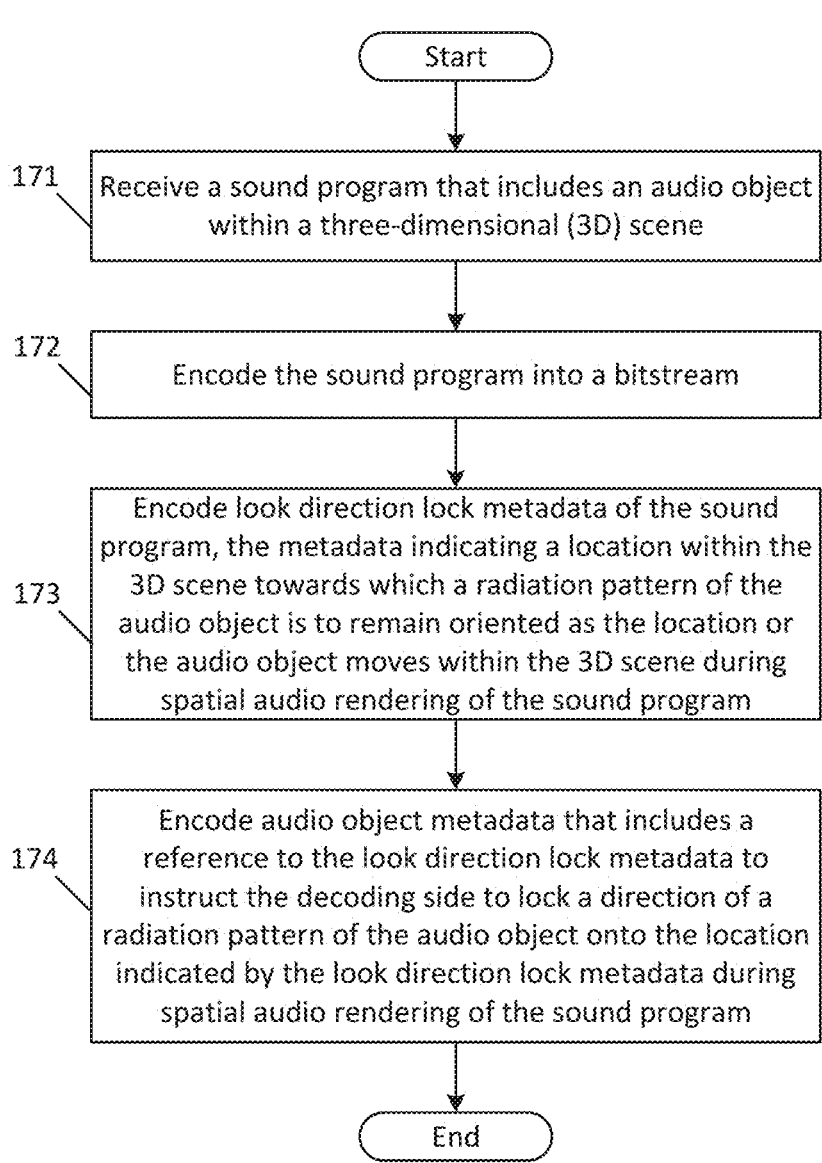

```
                    ┌──────────┐
                    │  Start   │
                    └──────────┘
                         │
                         ▼
        ┌─────────────────────────────────────────┐
   171  │ Receive a sound program that includes an │
        │ audio object within a three-dimensional  │
        │ (3D) scene                               │
        └─────────────────────────────────────────┘
                         │
                         ▼
        ┌─────────────────────────────────────────┐
   172  │ Encode the sound program into a bitstream│
        └─────────────────────────────────────────┘
                         │
                         ▼
        ┌─────────────────────────────────────────┐
        │ Encode look direction lock metadata of   │
        │ the sound program, the metadata          │
        │ indicating a location within the 3D      │
   173  │ scene towards which a radiation pattern  │
        │ of the audio object is to remain oriented│
        │ as the location or the audio object      │
        │ moves within the 3D scene during spatial │
        │ audio rendering of the sound program     │
        └─────────────────────────────────────────┘
                         │
                         ▼
        ┌─────────────────────────────────────────┐
        │ Encode audio object metadata that        │
        │ includes a reference to the look         │
   174  │ direction lock metadata to instruct the  │
        │ decoding side to lock a direction of a   │
        │ radiation pattern of the audio object    │
        │ onto the location indicated by the look  │
        │ direction lock metadata during spatial   │
        │ audio rendering of the sound program     │
        └─────────────────────────────────────────┘
                         │
                         ▼
                    ┌──────────┐
                    │   End    │
                    └──────────┘
```

Fig. 14

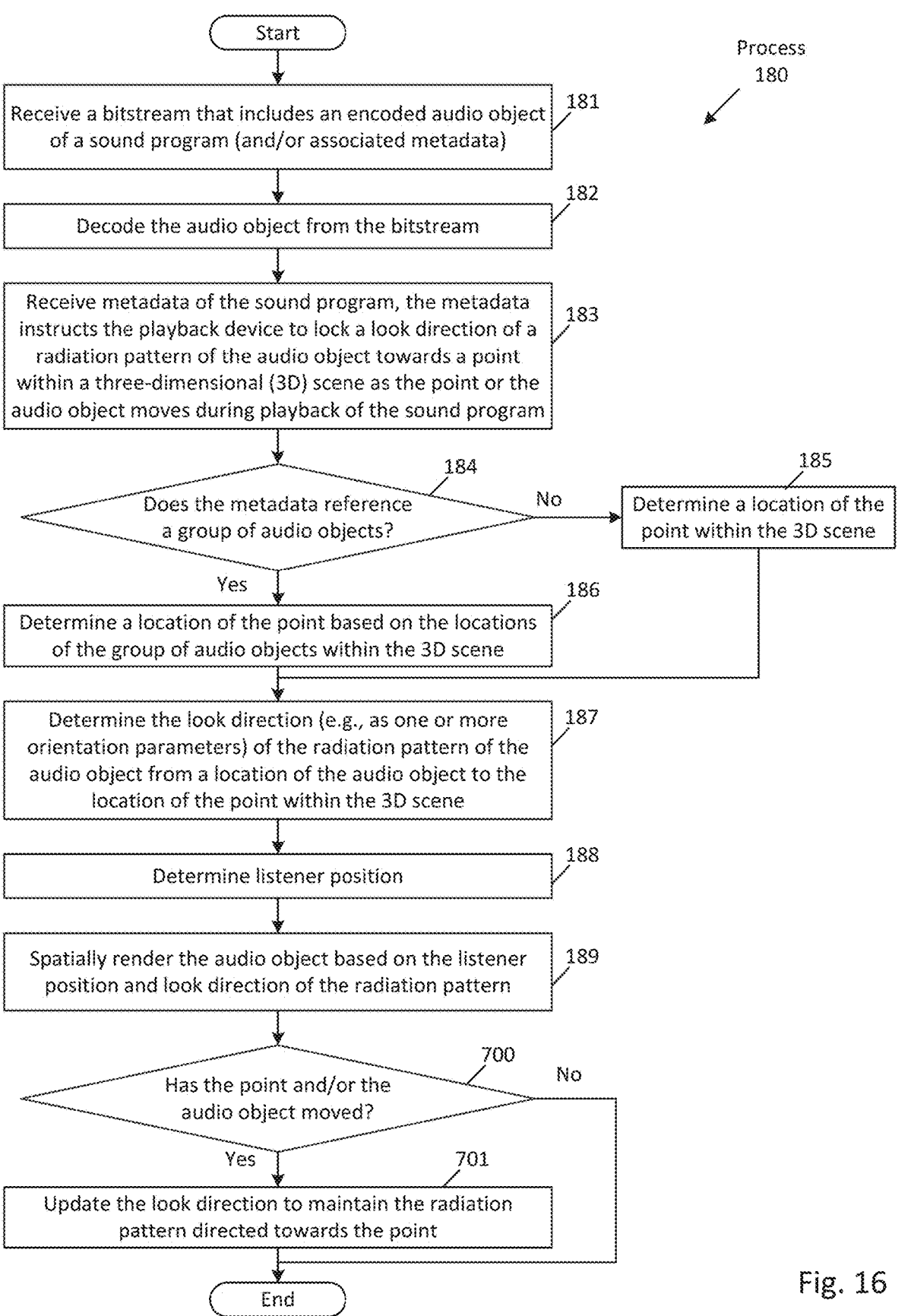

Process 180

Start

Receive a bitstream that includes an encoded audio object of a sound program (and/or associated metadata) — 181

Decode the audio object from the bitstream — 182

Receive metadata of the sound program, the metadata instructs the playback device to lock a look direction of a radiation pattern of the audio object towards a point within a three-dimensional (3D) scene as the point or the audio object moves during playback of the sound program — 183

Does the metadata reference a group of audio objects? — 184

No → Determine a location of the point within the 3D scene — 185

Yes

Determine a location of the point based on the locations of the group of audio objects within the 3D scene — 186

Determine the look direction (e.g., as one or more orientation parameters) of the radiation pattern of the audio object from a location of the audio object to the location of the point within the 3D scene — 187

Determine listener position — 188

Spatially render the audio object based on the listener position and look direction of the radiation pattern — 189

Has the point and/or the audio object moved? — 700

No

Yes — 701

Update the look direction to maintain the radiation pattern directed towards the point — 701

End

Fig. 16

METHODS AND SYSTEMS FOR AUTOMATICALLY UPDATING LOOK DIRECTIONS OF RADIATION PATTERNS

RELATED APPLICATION

This application claims the benefit of priority of U.S. Provisional Application No. 63/505,965, filed Jun. 2, 2023, which is herein incorporated by reference.

FIELD

An aspect of the disclosure here relates to automatically updating look directions of radiation patterns of audio objects of a sound program. Other aspects are also described.

BACKGROUND

A sound program can be produced as a live recording such as a recording of a concert or a sporting event (with or without accompanying video), or it can be previously recorded or previously authored, e.g., using a software application development platform for instance as the soundtrack of a segment of a video game. In all cases, the sound program may be tuned in the content creation side, using digital signal processing, to the taste of a content creator (e.g., a person working as an audio mixer.) The tuned sound program may then be encoded for bitrate reduction before being delivered to a listener's playback device, for instance over the Internet. At the playback device, or in the decoding side, the sound program is decoded and then rendered into speaker driver signals that are appropriate to the listener's sound subsystem (e.g., headphones, a surround sound loudspeaker arrangement.)

A sound program may be digitally processed by a spatial audio renderer, so that the resulting speaker driver signals produce a listening experience in which the listener perceives the program closer to how they would hear a scene if they were present in the scene that is being recorded or synthesized. The spatial audio renderer would enable the listener to for example perceive the sound of a bird chirping as coming from a few meters to their right, and another animal rustling through leaves on the ground a few meters to their left, or the sound of the wind blowing against the trees as being all around them.

SUMMARY

According to one aspect of the disclosure, a method includes displaying a user interface (UI) of a three-dimensional (3D) acoustic environment that includes a sound source; receiving a user selection, via an input device, of a location within the UI, the location towards which the sound source is to be oriented within the 3D acoustic environment; determining a set of parameters that define an orientation of the sound source towards the location within the 3D acoustic environment; determining that there is motion of the location or the sound source within the 3D acoustic environment; and updating, without user intervention and based on the motion, the set of parameters to maintain the orientation of the sound source towards the location.

In one aspect, the user selection is a first user selection, where the method further includes receiving a second user selection through the input device of a UI item that locks the orientation of the sound source with the location, where the set of parameters are determined responsive to the receiving of the second user selection. In another aspect, the sound source is a first sound source, and the location is one of: a static location within the 3D acoustic environment, a second sound source within the 3D acoustic environment, or a point within a region surrounded by a group of sound sources within the 3D acoustic environment. In some aspects, the motion of the location includes a movement of the second sound source from the location to a new location within the 3D acoustic environment, where the set of parameters are updated such that the orientation of the first sound source follows the second sound source from the location to the new location.

In one aspect, the sound source comprises a radiation pattern for sound of the sound source, where the orientation is a look direction the radiation pattern from the sound source and towards the location. In another aspect, the method further including fixing the orientation of the sound source towards the location responsive to receiving user input such that regardless of the motion of the location or the sound source, the orientation of the sound source remains directed towards the location. In another aspect, the method further including: encoding the sound source into a bitstream for transmission to a playback device; and providing metadata that includes the set of parameters, where the playback device is to be configured to render the sound source according to the set of parameters. In another aspect, the method further including, subsequent to providing the metadata, providing the updated set of parameters such that the playback device may adjust the orientation of the sound source during rendering of the sound source.

According to another aspect of the disclosure includes an electronic device including: at least one processor; and memory having instructions stored therein which when executed by the at least one processor causes the electronic device to: receive an audio object of a sound program, the audio object including a radiation pattern for projecting sound towards a look direction of the audio object within a three-dimensional (3D) scene; assign a point within the 3D scene of which the look direction of the audio object is to be directed towards; determine one or more orientation parameters for the look direction of the audio object; determine whether there is motion of the point or of the audio object within the 3D scene; and responsive to a determination that there is motion of the point or the audio object, update, based on the motion and without user intervention, the one or more orientation parameters to maintain the look direction directed towards the point.

In one aspect, the electronic device further including a display, where the memory has further instructions to display a user interface (UI) of the 3D scene on the display, where the instructions to assign the point includes instructions to receive, through an input device, a user selection of the point within the UI. In another aspect, the audio object is a first audio object, where the point is one of: a static location with respect to an origin within the 3D scene, a second audio object within the 3D scene, or a location within a region surrounded by a group of audio objects within the 3D scene. In one aspect, the location is a centroid of the region. In another aspect, the sound program is a live audio broadcast. In another aspect, the sound program is a live audio communication between the electronic device and a playback device.

According to another aspect of the disclosure includes a method performed by a playback device, the method includes: decoding an audio object of a sound program from a bitstream; and receiving metadata of the sound program, where the metadata instructs a decoding side to lock a look direction of a radiation pattern of the audio object towards a point within a three-dimensional (3D) scene as the point or the audio object moves during playback of the sound program.

In one aspect, the point is a location within the 3D scene, metadata includes coordinates of the location within a coordinate system with respect to an origin of the 3D scene. In another aspect, the audio object is a first audio object, where the metadata includes a reference to a second audio object and the point is a location of the second audio object within the 3D scene. In some aspects, the metadata includes a group of references to a group of audio objects within the 3D scene, where the method further includes: determining locations of the group of audio objects based on the group of references; determining a location of the point within an area bounded by the locations of the group of audio objects; and determining the look direction of the radiation pattern of the audio object from a location of the audio object to the location of the point within the 3D scene.

In one aspect, the point is at a first location within the 3D scene, where the method further includes: receiving additional metadata indicating that the point has moved to a second location within the 3D scene; and moving the look direction of the radiation pattern from the first location to the second location over a period of time. In another aspect, the method further including determining an angle between the first location and the second location with respect to the location of the audio object within the 3D scene, where moving the look direction includes rotating the look direction along the angle about the location of the audio object at a velocity based on the period of time.

In one aspect, the metadata further includes one or more angular offsets, where the method further includes spatially rendering the audio object such that the look direction of the radiation pattern is offset from the point based on the one or more angular offsets. In another aspect, the method further including: determining a position of a listener within the 3D scene; and producing a set of spatially rendered audio signals by spatially rendering the sound program according to the look direction of the radiation pattern of the audio object and the position of the listener; and using the set of spatially rendered audio signals to drive a set of speakers to playback the sound program. In another aspect, the point within the 3D scene is the position of the listener, where the method further includes determining one or more orientation parameters for the look direction of the radiation pattern to be oriented towards the position of the listener, where the set of spatially rendered audio signals are produced according to the one or more orientation parameters.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 4 shows a table of an example set of reverberation-related fields in the metadata.

FIG. 7 depicts an example dictionary or codebook for storage of radiation or directivity patterns.

FIG. 8 shows a table of an example set of fields in the metadata for controlling the application of a radiation pattern.

FIG. 10 is a block diagram of an audio system that includes at least an audio authoring device according to one aspect.

FIG. 14 is a flowchart of one aspect of a process at the encoding side for encoding metadata that indicates a location within the 3D scene towards which the radiation pattern of an audio object remains oriented during playback of the sound program.

FIG. 16 is a flowchart of one aspect of a process at the decoding side for decoding metadata that instructs the decoding side to direct the radiation pattern of the audio object towards a point within the 3D scene during playback of the sound program.

DETAILED DESCRIPTION

Figure 1:
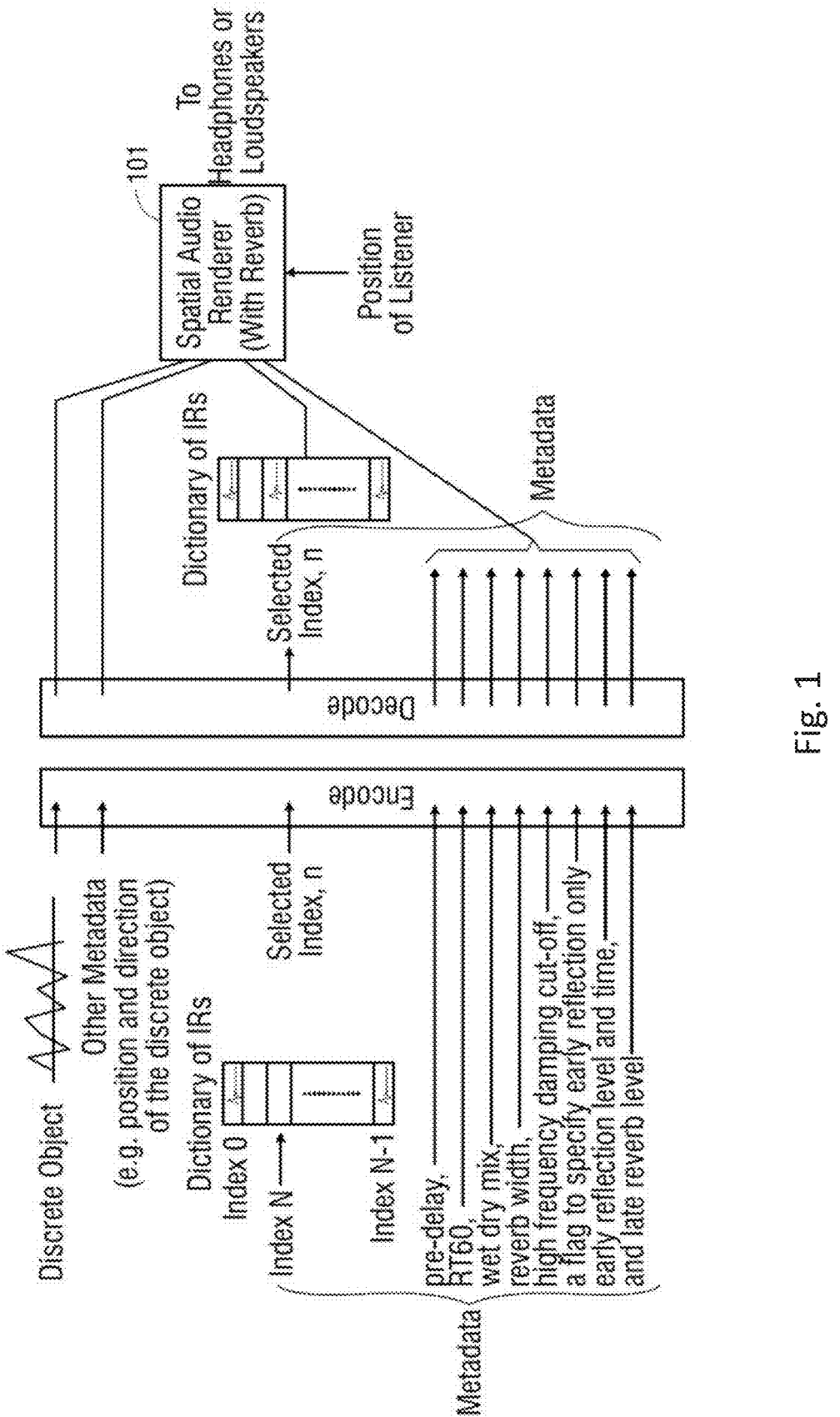
FIG. 1 is a block diagram of encoding side and decoding side processes for spatial audio rendering using metadata having an index to a room impulse response and optional reverberation parameters.

Referring to FIG. 1, this is a block diagram of example digital processes being executed in an encoding side and in a decoding side for spatial audio rendering using metadata. In the encoding side, the sound program may be obtained in the form of one or more constituent audio stems, or one or more constituent audio objects including for example a group of two or more objects, where each object is an audio signal, e.g., a pulse code modulated, PCM, audio signal. Alternatively, the sound program may be in the form of channels (e.g., 5.1 or 7.1.4), or in the form of Higher Order Ambisonics (HOA.) The sound program may also be in a mixed scene format, e.g., where the sound field includes not only audio objects but also channels and an HOA representation. While the techniques described below are in the context of objects, those techniques are also applicable on a per channel basis when the sound program is or contains a segment that has a channel format, and to a segment of the sound program that is in an HOA representation.

The sound program may be music as for example the sound of several instruments being played by a band, dialog such as the separate voices of one or more actors in a play or participants of a podcast, a soundtrack of a movie having dialog, music, and effects stems, etc. The sound program may be a live recording of (being recorded in real time), e.g., a concert, a sporting event, an on-location news report, etc., a combination of a live recording and synthesized audio signals, or it may be a previously recorded or previously authored music or audio visual work for example using a software development kit, e.g., a video game or a movie. Reverberation A content creator (such as for example an audio mixer who may be a person having the needed training for mixing audio) determines a scene reverberation on a per object basis, on a per channel basis, or for an HOA representation. In one instance, the content creator does so by selecting an impulse response (IR) from a dictionary or codebook of IRs. The selected IR is to be applied to the object, channel, or the HOA representation, by a decoding side process during playback. The audio objects of the sound program are encoded into a bitstream, for purposes of bitrate reduction, while an index or pointer to the selected IR for each object is provided as metadata associated with the sound program. The metadata may also contain other information about each object, such as a position of the object relative to an origin that may represent a listening position (e.g., its distance from the origin, its azimuth angle, and its elevation angle.) The metadata may also be separately encoded for bitrate reduction. The metadata may be provided to the decoding side via a separate communication channel, or it may be incorporated into the bitstream along with the sound program.

In the decoding side, the bitstream and the metadata are provided to or obtained by a playback device, e.g., over the Internet. The playback device may be for instance a digital media player in a console, a smartphone, a tablet computer, etc. One or more decoding side processes are performed by a programmed processor in the playback device. These serve to undo the encoding to recover the audio objects, channels, or HOA representation that make up the sound program, and to extract from the metadata the index to the selected IR. The same or another decoding side process may then perform a look up using the extracted index, into a dictionary or codebook of IRs to obtain the selected IR. Note here that an IR may be defined by its time domain behavior, its transfer function, or by the digital filter coefficients that in turn define a reverberation digital filter whose impulse response (or equivalently its transfer function) is the selected IR.

Figure 2:
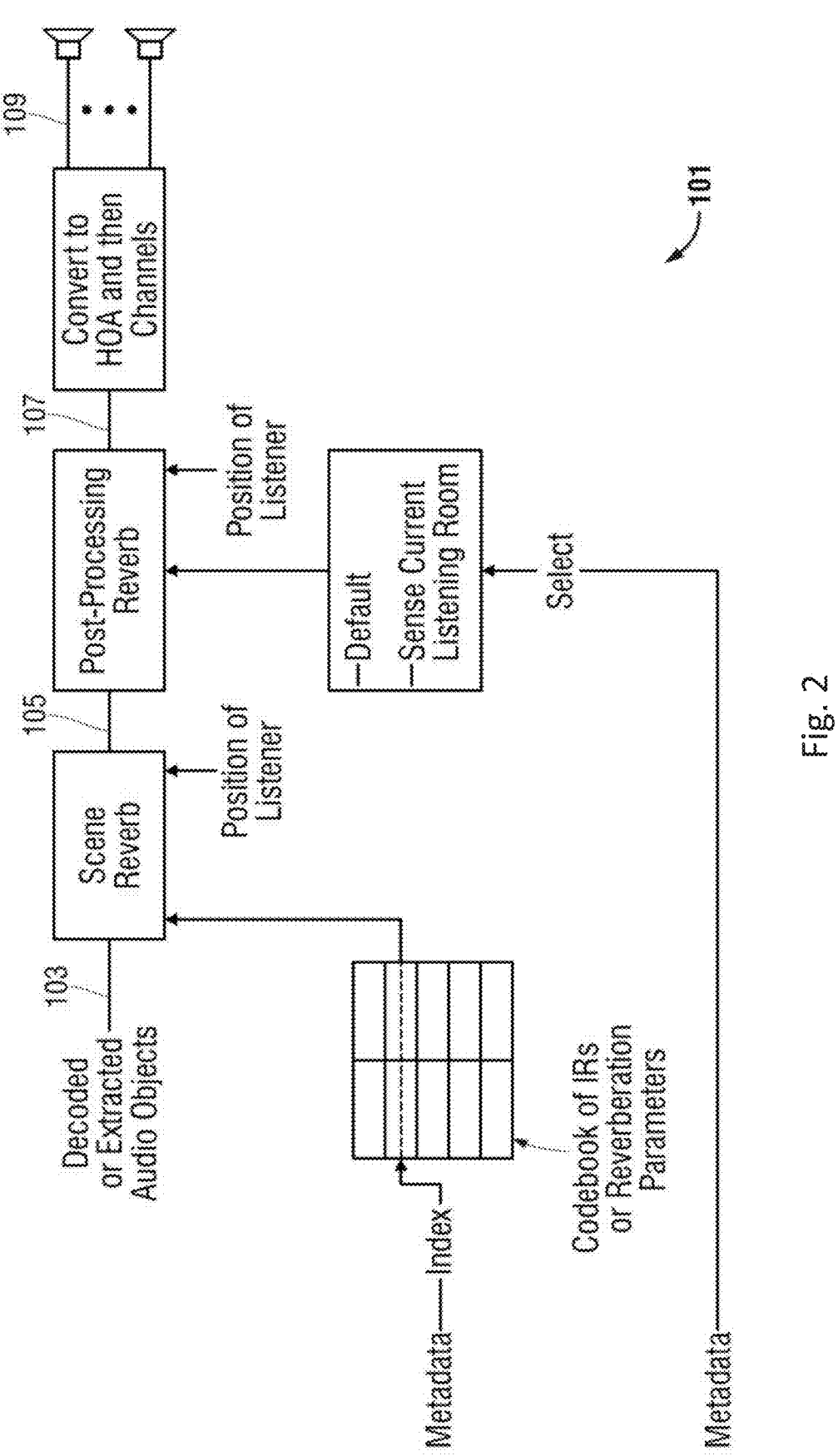
FIG. 2 depicts a block diagram of an example decoding side spatial audio rendering process with reverberation.

The decoding side also includes a spatial audio renderer 101. FIG. 2 depicts a block diagram of an example spatial audio rendering process that produces speaker driver signals 109 suitable for the listener's sound subsystem which is depicted by the speaker symbols. The speaker driver signals 109 may be binaural or headphone signals, or they may be loudspeaker driver signals for a particular type of surround sound subsystem. The spatial audio renderer does so by applying to each of the extracted or decoded audio objects 103 (audio signals) of the sound program its respective, selected IR and then converting the resulting scene reverberated audio objects 105 into the speaker driver signals 109. This conversion may take place by, as an example, first converting the decoded audio objects 103 into higher order ambisonics, HOA, format and then converting the HOA format into the speaker driver signals 109. Alternatively, the decoded audio objects 103 may be converted directly into the channel format of the sound subsystem. The speaker driver signals 109 will then drive the sound subsystem, which reproduces the sound program.

The resulting output by the sound subsystem enables the listener to experience the sound program as desired by the content creator, with fine granularity or high spatial resolution, because each audio object, channel, or HOA segment is now rendered in a discrete manner with its respective scene reverberation effect. Also, if the spatial audio renderer 101 is so equipped, each audio object and its respective scene reverberation can be spatially rendered in accordance with the listener's position (e.g., distance and direction) relative to any suitable reference that also considers the position and orientation (look direction) of a virtual sound source which is treated as the source of the sound defined in an audio object. And finally, there may be a coding advantage in some cases, for example where the audio objects are not numerous, relative to encoding the sound program as multiple channels. These advantages may offset the increased complexity of the decoding side processing in the playback device.

FIG. 2 also shows yet another aspect where the encoding side process provides, as part of the metadata, indices to one or more parameters that are specified by the content creator for modifying the selected, scene reverberation IR. The modification may be performed by the spatial audio renderer 101 on the decoding side. Parameters which may be stored in a codebook that is accessible to both the encoding side and the decoding side may include pre-delay, RT60, wet dry mix, reverb width, high frequency damping cutoff, a flag to specify early reflection only, early reflection level and time, and late reverb level. This feature enables the IR dictionary or codebook to have a fewer number of predetermined IRs yet enabling greater flexibility in determining the desired scene reverberation, because the content creator now can modify their selected IR in several ways.

FIG. 2 illustrates another aspect where, if so equipped, the spatial audio renderer 101 may apply post processing reverberation to an identified audio scene component (e.g., an audio object, a channel, or an HOA representation) of the sound program during playback, resulting in post processing reverberated audio objects 107. This would be in addition to applying the scene reverberation discussed above (which produces the scene reverberated audio objects 105.) The post processing reverberation may also be in the form of an IR that is convolved with the individual, scene-reverberated audio objects. The post processing IR incorporates into the sound program the acoustic characteristics of a listener's actual room, and as a result it may enhance the listener's sense of externalization of the audio object as virtual sound sources. In other words, the sounds of the audio objects are more likely to be perceived to be coming from outside the listener's head.

In one aspect, the post processing IR is controlled by the metadata, allowing the content creator to select between a previously determined IR that is for a default acoustic environment (e.g., as a function of for example the type of playback device), or an IR that is generated based on sensing the environment or room in which the listener is experiencing the playback. The latter IR may be generated based on sensed data that measures the dimensions of the real room (e.g., the room that surrounds the listener at playback time), senses certain objects like furniture and windows in the real room, or acoustic parameters like reverberation time RT60 and direct to reverberant ratio.

Figure 3:
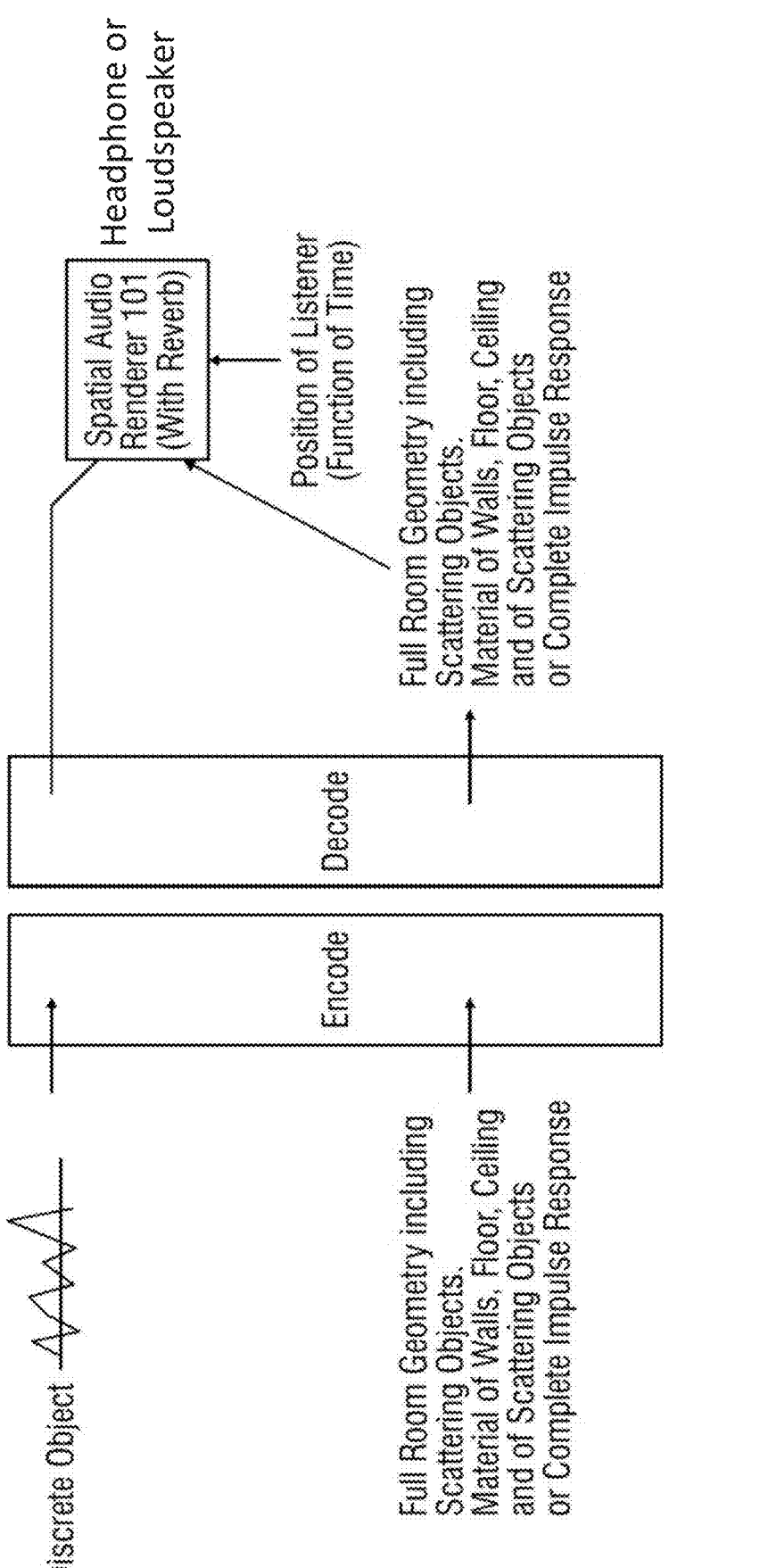
FIG. 3 is a block diagram of encoding side and decoding side processes for spatial audio rendering using metadata having full room geometry or a complete impulse response for reverberation.

Turning now to FIG. 3, this is a block diagram of another arrangement of processes, executing in an encoding side and in a decoding side, for spatial audio rendering using metadata. Here in FIG. 3, the sound program is (similarly to FIG. 1) obtained in the form of one or more audio stems, or one or more audio objects including perhaps a group of two or more objects, where each object or stem, or grouped object or stem, is an audio signal, e.g., a pulse code modulated, PCM, audio signal. Rather than select from a dictionary or codebook of predetermined IRs (see also FIG. 2), the content creator in this case selects or specifies either a full room geometry, or a complete IR, for their desired scene reverberation (that will be applied by the decoding side.) The full room geometry or the complete IR is provided in the metadata, which is then provided to the decoding side either separately from the sound program or incorporated into the bitstream containing the sound program. The full room geometry is extracted by a decoding side process and then used by the spatial audio renderer 101 to compute (simulate or synthesize) an IR from the full room geometry, and then apply the synthesized IR to the extracted audio object (or group of audio objects) or stems, as instructed in the metadata. The full room geometry may include dimensions of a room, material of walls, floor, and ceiling of the room, one or more scattering objects such as furniture, and a material of the scattering object. In the case where the metadata instructs the decoding side to use a complete IR that is in the metadata, the decoding side will extract the complete IR and apply it directly to the extracted audio objects or stems as specified in the metadata.

FIG. 4 shows a table of example messages that may be inserted by the encoding side process into the metadata. In particular, the table shows a mSceneReverbIndex message for instructing the decoding side on whether to apply scene reverberation (and how), and shows a mPostProcReverbIndex message for instructing the decoding side on whether to apply post-processing reverberation (and how.) Turning to a mSceneReverbIndex, this message may include one or more values for instructing the decoder how to process reverberation of 1) a global audio scene, 2) individual scenes, such as on a per audio object basis or on a group of audio objects, 3) on a per channel basis or on a group of multiple channels, and/or 4) on a HOA representation. In one aspect, this index may be static or may be dynamic, such that parameters (scene reverberation) may change during playback.

Based on the index, the message within the metadata may instruct a decoder side how to apply scene reverberation. As shown, when the index is "0", the message instructs the decoder side to apply no scene reverberation, such that the rendered audio by the decoding side has no reverb added. In which case, the output sound by the decoding side may "completely dry" in that the sound may not include any added reverberation. When the index is "1", the message instructs the decoding side to apply scene reverberation in accordance with one or more preset codebooks having one or more reverberation parameters. In particular, the message may indicate that the decoding side is to apply reverberation in accordance with one or more preset codebooks of IRs and/or reverberation parameters. In one aspect, the metadata may include an index of an IR from several IRs (e.g., in the codebook), where the metadata (or message) may indicate that scene reverberation is to be applied in accordance with an index. In another aspect, the metadata may include an index of a set of reverberation parameters, which may include one or more of pre-delay, RT60, wet dry mix, reverb width, high frequency damping cut-off, a flag to specify early reflection only, early reflection level and time, and late reverb level.

When the index is "2" the message may instruct the decoding side that the encoding side is to directly transmit one or more reverb parameters. When the index is "3" the message may instruct the decoding side to apply scene reverberation in accordance with one or more preset codebooks having one or more reverb filter coefficients. When the index is "4", the message may instruct the decoding side that the encoding side is to directly transmit reverb filter coefficients, which may be used by the decoding side to define a reverberation digital filter. In one aspect, the metadata may include a set of filter coefficients, from which the decoding side may select and use. In one aspect, the encoding side may transmit lightweight parameters and/or filter coefficients to be used before reverb parameters and/or filter coefficients, respectively, are received.

When the index is "5" the message may instruct the decoding side to apply scene reverberation in accordance to preset codebooks having room geometry-based reverberation parameters. For instance, the message may indicate that the decoding side apply scene reverberation in accordance with a full room geometry or apply the scene reverberation in accordance with a selected set of room-geometry-based reverberation parameters. In one aspect, the metadata contains a field for the content creation side to specify a full room geometry, and another field to specify an index to a selected set of room-geometry-based reverberation parameters. In one aspect, the metadata may include geometry-based reverb parameters, which may include at least one of: a number of sub-bands, RT60 per sub-band, early room energy per sub-band, late room energy per sub-band, room volume, and/or room surface. When the index is "6" the message may instruct the decoding side that the encoding side is to direct transmission of room geometry-based reverb parameters. In one aspect, the encoding side may also transmit lightweight parameters may also be transmitted to be used before the room geometry-based reverb parameters are received by the decoding side.

Turning to a mPostProcReverbIndex, this message (which may be a separate message from the mSceneReverbIndex message) may include one or more values for instructing the decoding side how to apply post-processing reverb, which may be following the scene reverberation. In another aspect, the post-processing reverb may be applied, while scene reverberation may not be applied by the decoding side. In one aspect, this message may indicate a global parameter to describe an acoustic environment. In some aspects, the value indicated by the message may include one or more static parameters.

When the value is "0" the message instructs the decoding side that no post-processing reverberation is to be applied (e.g., completely dry). When the value is "1" the message instructs the decoding side to apply default post-processing reverberation. In particular, the post-processing reverberation is applied during the playback of the audio content in accordance with a default acoustic environment. When the value is "2" the message instructs the decoding side to apply only early reflections. In one aspect, this message may instruct the decoding side to apply the post-processing reverberation in accordance with a shortened IR or an early-reflections-only IR. In which case, metadata may include the length of the early reflection.

Radiation Pattern/Directivity and Look Direction

Figure 5:
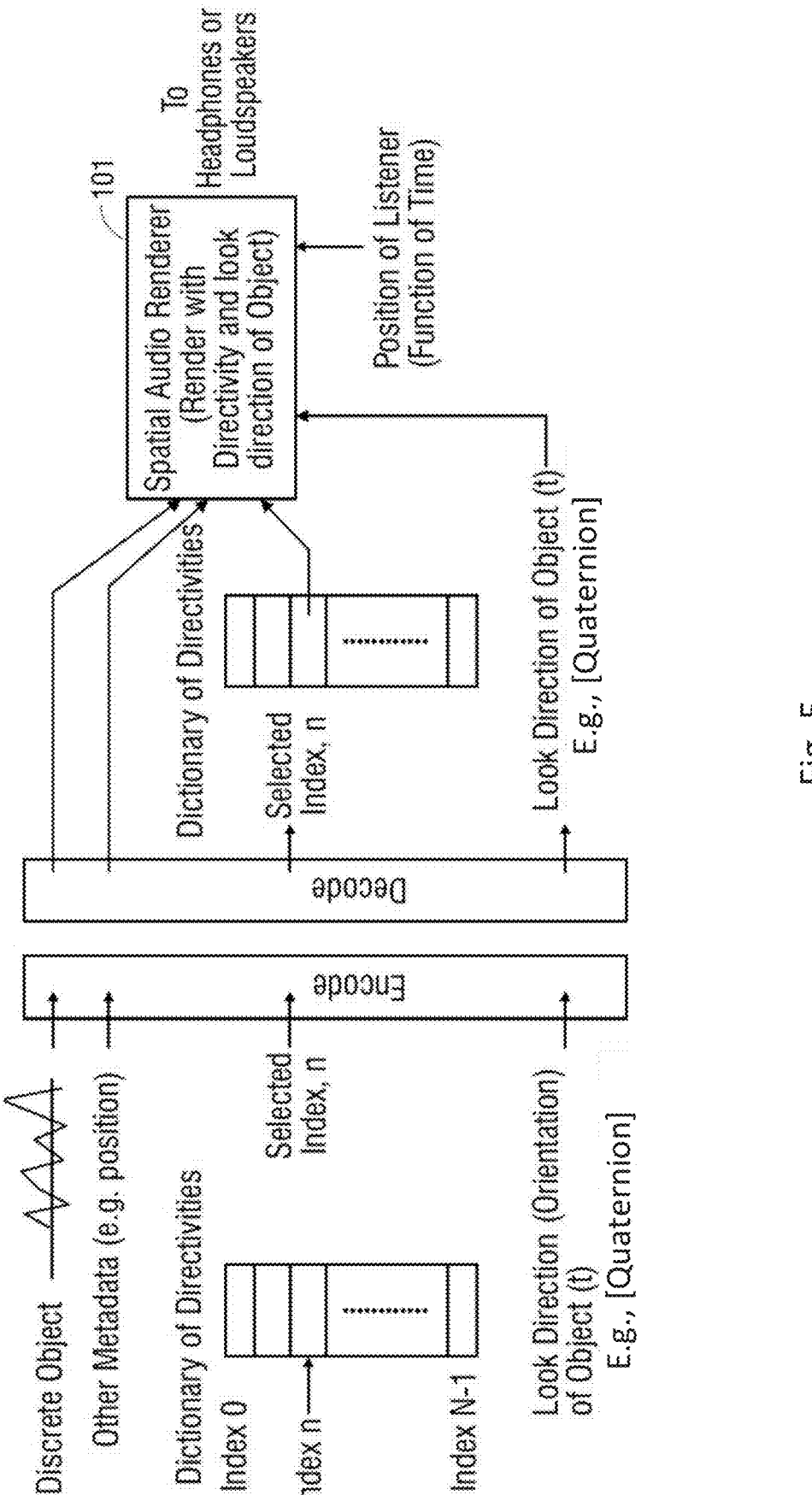
FIG. 5 is a diagram of encoding side and decoding side processes for spatial audio rendering using metadata that instructs the decoding side to use a selected directivity.

Turning now to FIG. 5, this diagram depicts encoding side and decoding side processes for spatial audio rendering using metadata, in which the metadata instructs the decoding side on how to render a particular audio object (as a virtual sound source) during playback of the sound program, as a virtual sound source that has a selected directivity. The discrete audio object may be the voice of a person, or the sound produced by a musical instrument. In one instance, the content creator selects a first index to a dictionary or codebook of radiation patterns or directivities that are stored in the decoding side. The dictionary of directivities contains directivities of distinct types of sound producing objects. The content creator need not know the actual radiation pattern they are selecting but instead may simply select the first index as the type of their discrete object, based on their knowledge of the type of discrete object. Each object type has a respective radiation pattern, e.g., a person's voice, a guitar, a grand piano, etc.

Figure 6:
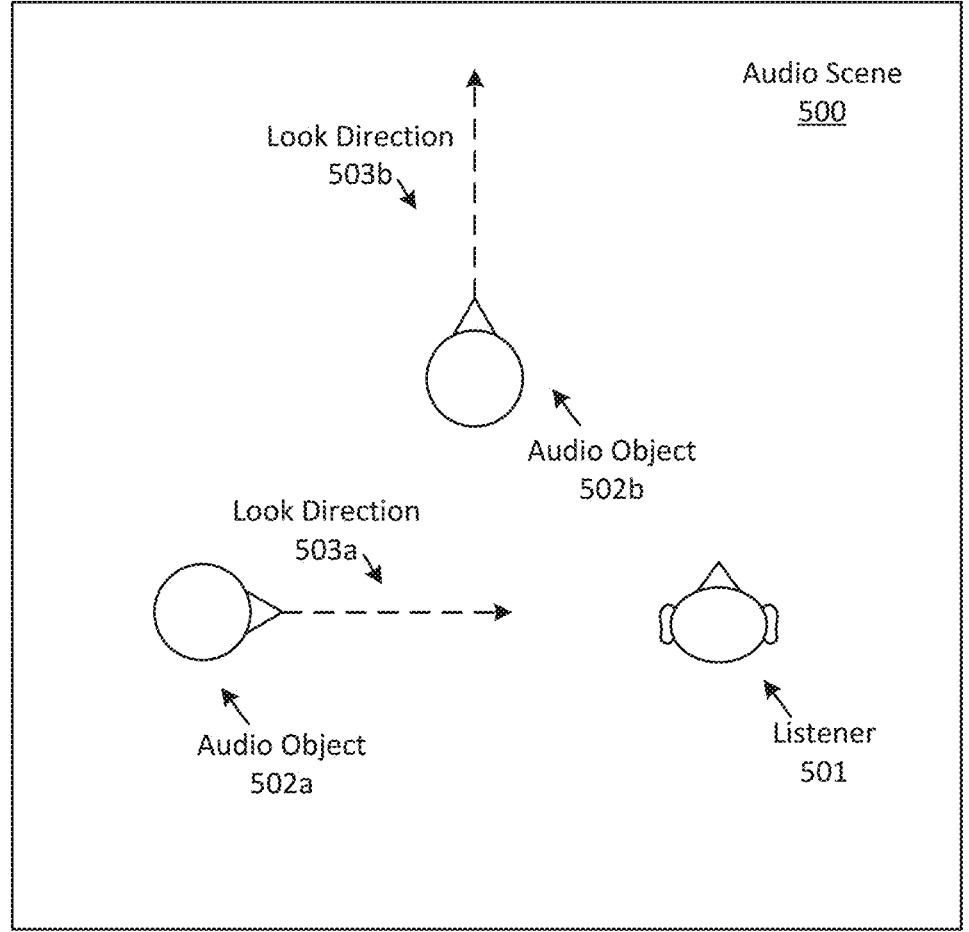
FIG. 6 shows an example of look directions of audio objects according to one aspect.

The metadata will also contain a selected look direction or orientation of the virtual sound source associated with a given audio object. An example is shown in FIG. 6, which shows an audio scene 500 that includes a listener (or listener position) 501 and several audio objects 502a and 502b, each having a respective look direction 503a and 503b. In particular, the look direction 503a is directed towards the left side listener 501, while the look direction 503b is directed away from (and in front of) the listener 501. For example, an audio object may be the voice of a person, or the sound produced by a particular machine, e.g., in a movie or a video game. The encoding side process may determine a look direction of the character representing the person or of the machine. It then inserts a pointer to the look direction into the metadata, as a second index. The second index points to a previously defined look direction which may be in the form of an azimuth-elevation pair, for example, which represents a direction in which a primary axis of the type of object finds itself, as a yaw-pitch-roll triple, or as a quaternion. The yaw-pitch-roll triple and the quaternion may be used when orientation of the virtual sound source around the look direction axis counts or is of importance, such as when the radiation pattern does not have axial symmetry around its look direction.

Like the reverberation aspect described above, the encoding side process repeats to determine the selected directivities and look directions for any other desired objects in the sound program. The indices to the selected directivities (as associated with their respective audio objects) together with the look directions are provided as metadata associated with the sound program. Such metadata enables the decoding side to render the audio object so that the listener can hear the virtual sound source (associated with the object) differently at each of multiple listening positions in 3D space, because at each listening position the source directivity filtering is dependent on the position of the listener.

In the decoding side, the bitstream and the metadata are provided to or obtained by the playback device, e.g., over the Internet. The playback device may be for instance a digital media player in a console, a smartphone, a tablet computer, etc. One or more decoding side processes are performed by a programmed processor in the playback device. These serve to undo the encoding to recover the audio objects that make up the sound program, and to extract from the metadata the index to the selected directivity for each of the decoded audio objects.

A decoding side process may then perform a look up using the extracted first index (e.g., which may represent a type of object) and second index (e.g., represents a direction in which a primary axis of the type of object finds itself), into the stored dictionary or codebook of directivities to obtain the selected directivity or radiation pattern. As above, the spatial audio renderer 101 then applies to each of the extracted or decoded audio objects 103 (audio signals) of the sound program its respective, selected directivity and then converts the resulting directivity-adjusted audio objects into speaker driver signals. Note here that although not all of them may have been mentioned here, several of the variations described above in connection with the reverberation aspect in FIGS. 1-3 are also applicable to the directivity aspect in FIG. 5 (e.g., conversion of the decoded audio objects 103 into higher order ambisonics, HOA, format and then converting the HOA format into the speaker driver signals 109, or directly into the channel format of the sound subsystem.)

FIG. 7 shows how the directivities (radiation patterns) may be stored in the codebook. Each row of the codebook refers to a different object type, while each column refers to a different look-direction of the object (e.g., azimuth and elevation and/or yaw, pitch, and roll.) In one aspect, the column may refer to the emission direction of the sound radiation. This is of course just an example as the two row and column axes may be defined differently. Each entry of the codebook may be the set of HOA coefficients, per frequency band, of the sound field that would be generated by the type of object that is assigned to the row, when that type of object is oriented in the look direction given by the column. In another aspect, each entry of the codebook may be coefficients that would be generated when the listening position is in the position given by the coordinate given by the column, in the objects referential. Thus, the decoding side process extracts the object type and determines the coordinates of the listening position in the object's referential, so as to use this data as indices into a lookup table, to obtain a radiation pattern that is then used by the spatial audio renderer 101 to render the decoded audio object. The output radiation pattern may be applied directly to the audio object, or an interpolation may be performed for example between two radiation patterns in the lookup table whose coordinates are around a desired direction.

Referring to FIG. 5, for greater realism, when the spatial audio renderer 101 renders the object using the radiation pattern obtained from the table lookup, it may also consider the position of the audio object (the virtual sound source) relative to the position of the listener. In another aspect, the audio renderer may also consider the look direction of the listener. In one aspect, the position of the listener or the look direction of the listener may vary as a function of time during rendering of the audio content. In which case, if the listener's look direction is known (e.g., measured based on head tracking indicated by the position of the listener) and the object's look direction is received by bitstream (e.g., object metadata), a proper radiation pattern may be selected. In another aspect, the chosen radiation pattern index (or indices, in the case of interpolation between two responses) may depend only on the position of the listener, or more specifically their cars, in the orientated referential of the object.

In the case where the type of audio object does not match any of the ones in the available or stored codebook (or a type of another object is not in the codebook, lookup table, or dictionary), the content creator may elect to insert into the metadata a direct definition of the non-matching object's directivity. For example, the definition may include a selected radiation pattern when the non-matching object is oriented at the selected azimuth and elevation. Alternatively, the definition may be the HOA coefficients (per frequency band) of the sound field produced by the non-matching object as oriented in the selected look direction. The metadata may thus be provided with one of the following items, along with instructions to the decoding side to apply that item to the other audio object, during the playback spatial audio rendering: a set of digital filter coefficients that define an impulse response; a set of HOA coefficients on a per frequency band basis; or a set of radiation patterns on a per frequency band basis. The each of the radiation patterns may be given as a shape being for example omni, cardioid, super-cardioid, dipole, etc. In addition, the metadata may indicate a sharpness of the shape. Alternatively, the shape may be a cone that is defined by a specified inner angle, an outer angle, and an outer gain. In yet another alternative, the shape may be a physically based spherical cap given by a sphere radius and cap opening angle.

FIG. 8 shows a table of an example set of fields in the metadata for controlling the application of a radiation pattern. In particular, the table shows a Radiation Pattern Description (RPD) message for instructing the decoding device on applying a reverberation pattern during playback of audio content. The message may include one or more values (of the index), based on which the decoding side may apply selected reverberation. When the index is "0" the encoding side indicates that filter coefficients for M look directions of a sound object are stored within the (e.g., renderer of the) decoding side. In which case, based on the selected look direction, the renderer may select the appropriate filter coefficients (e.g., performing a table look). When the index is "1" the encoding side instructs the decoding side the filter coefficients for M look directions of O sound source types are stored in the renderer. As a result, when the type of object is known, the decoding side may retrieve the appropriate filter coefficients for the appropriate type of object.

When the index is "2", the message instructs the decoder side that the radiation pattern parameters for M look directions of a sound object are transmitted to the renderer. In one aspect, the radiation pattern parameters may include at least one of a collection of cardioid per sub-band (e.g., [frequency, pattern (0=omnidirectional, 0.5 cardioid, 1=dipole), sharpness (e.g., gain=gain ˆ sharpness)], collection of cone per sub-band [frequency, inner-angle, outer-angle, outer-gain], physically-based spherical cap [sphere radius, cap opening angle], spherical harmonic description per sub-band. When the index is "3" the radiation pattern parameters for M look directions of O sound source types are transmitted to the decoding side. In which case, the metadata received by the decoding side may include at least one radiation pattern parameters described herein. When the index is "4" the message indicates that the encoding side is to transmit the radiation pattern parameters for M look directions of each audio object to the decoding side.

As a result, an object's look direction (and its index) may be transmitted by bitstream (e.g., via object metadata). Look directions may be determined at the decoding (playback) side and the object's look direction received through a bitstream metadata may select proper filter coefficients/parameters. In one aspect, indices 1 and 4 of the table, a source-type index of each object may be transmitted by the encoding side to the decoding side.

In one aspect, audio objects may be used in audiovisual media to emulate the acoustical characteristics of audio signals in a three-dimensional (3D) space individually or in combination with any number of object-based, channel-based, and/or Ambisonics audio signals. Audio objects in a 3D audio scene may be rendered based on a scene graph (or scene tree structure) that describes their locations relative to a stationary or mobile position of a listener. More about scene graphs is described herein.

The ability to apply a physically modeled or a synthetically generated radiation pattern when spatially rendering one or more audio signals emulates the directionality and spectral characteristics of an acoustic behavior measured by the radiation pattern. Radiation patterns may be derived from physical models of sound sources, such as human vocal tract, acoustic musical instruments, speaker cabinet enclosures, as well as microphone polar patterns, which may describe areas of signal and spectral sensitivity of different microphone capsules. When such a radiation pattern is applied to the spatial rendering of an audio signal (e.g., audio object signal), the orientation of the radiation pattern relative to the position of the listener may inform the perceived directionality of the sound emanating from the audio object (sound source) position; for example, a human voice oriented towards or away from the listener from the same fixed relative position.

During content creation of a sound program, an author may wish to have the orientation of a radiation pattern of an audio object move within a sound space with respect to a listener. This may be the case when the position (e.g., orientation and/or location within a sound space) of an audio object is changing over time. For example, authoring the sound of a person talking to another person who is walking by, may require the sound source's orientation to move as the other person is walking by. To create this effect the author may be required to manually adjust the orientation of the audio object's radiation pattern, such as through a software program (e.g., a user interface through which the author creates the sound program). This would mean manually adjusting orientation parameters of the sound source at various times in the sound program, which may be a laborious and inefficient task, especially when there are several audio objects within a sound space that would need to be manually updated by the author. Therefore, there is a need for a method and system for fixing (or locking) a look direction (or orientation) of (e.g., a radiation pattern of) an audio object to a point (or location) within a sound space so as to automatically maintain the look direction of the radiation pattern onto the point within the sound space regardless as to whether the point or the audio object moves within the sound space.

To solve this problem, the present disclosure provides an audio authoring system that effectively and efficiently fixes an orientation of a radiation pattern of an audio object to a point (e.g., a static location, another audio object, etc.) within a 3D acoustic scene as either the point or the audio object moves within the scene. Specifically, such an audio authoring system may automatically adjust the look direction of the radiation pattern with respect to a coordinate system in order to keep the radiation pattern pointed towards a point or location within the space, regardless as to whether the point or object moves within the space. An audio software application, such as an audio content authoring application that may be executed by an electronic device may perform operations to fix an orientation of a sound source within a 3D scene of a sound program. For instance, a location within a 3D acoustic environment (or acoustic scene) may be determined towards which a sound source associated with an audio object is to be oriented within the environment. Specifically, the orientation may be with respect to a radiation pattern of the sound source, where the radiation pattern may be used to define the acoustics of the diffusion of the sound source within the 3D scene. Such a location may be user-defined within a user interface (UI) of the software application, for example. A set of parameters that may define an orientation of the sound source towards the location may be determined. Such parameters may include a quaternion, which may be four normalized parameters that define an orientation of a sound source (e.g., with respect to coordinate system axes). The system may determine that there is motion of the location or the sound source. The authoring system may update, without user intervention and based on the motion, the set of parameters to maintain the orientation of the sound source towards the location. Thus, as a position of an audio object (or a location towards which the object is pointing) is changing over time within the sound program, the system may continuously update the parameters which define the orientation vector of the radiation pattern. As a result, the present disclosure provides a method and system by which the parameters which may define the orientation vector of the radiation pattern are continuously and automatically updated within an audio content authoring application to ensure that the audio object radiation pattern's orientation is always directed towards a location within a 3D scene, which may be a fixed (static) location, another (mobile) audio object in the 3D scene, or a location within a region surrounded by a group of mobile audio objects, for example.

Figure 9:
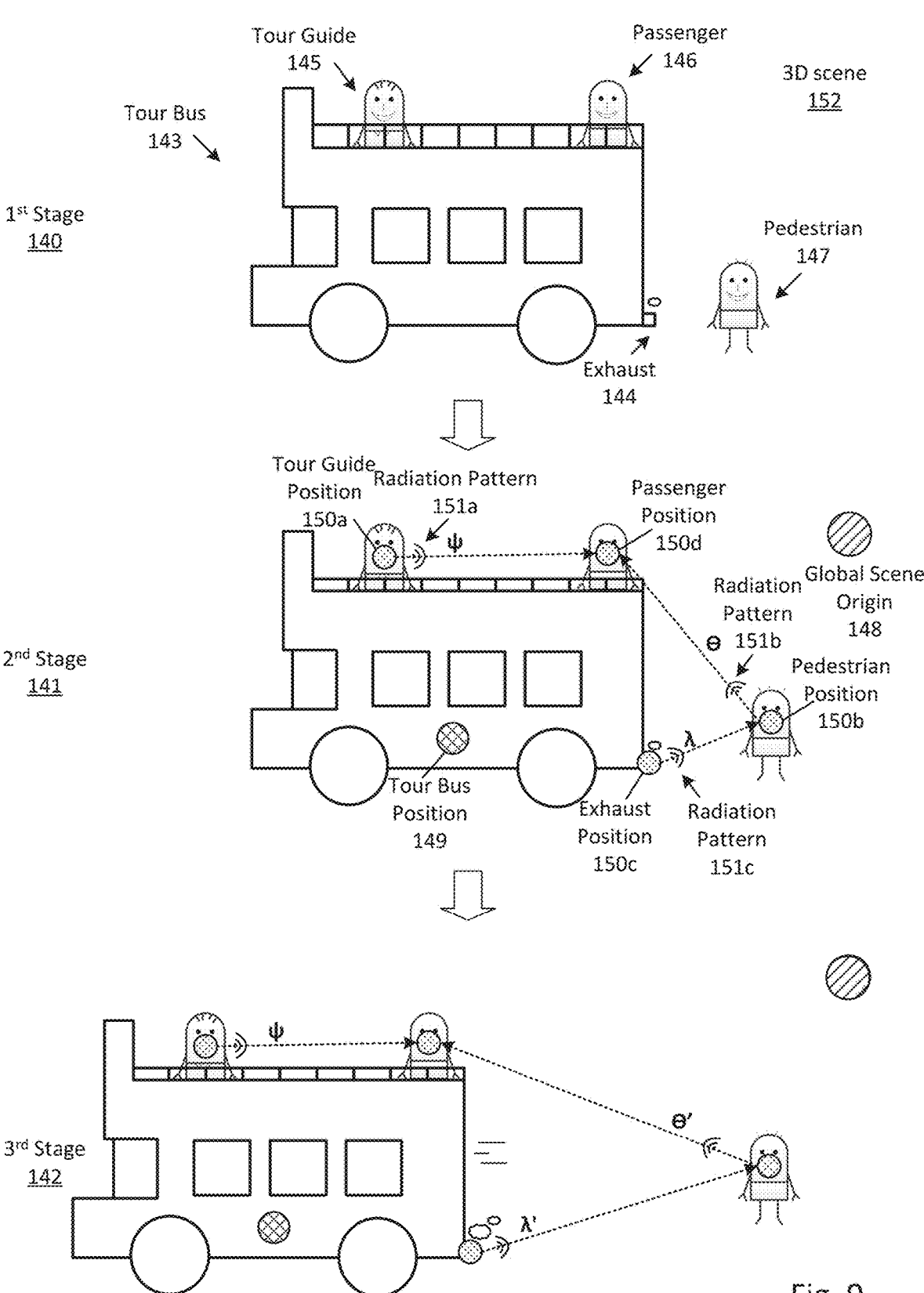
FIG. 9 illustrates several stages of an example of a three-dimensional (3D) scene of a sound program according to one aspect.

FIG. 9 illustrates several stages 140-142 of an example of a 3D scene 152 of a sound program in which orientations (or look directions) of radiation patterns for audio objects may be automatically updated based on movements within the 3D scene according to one aspect. The first stage 140 shows the 3D scene 152 that includes a tour bus 143 and a pedestrian 147. In one aspect, this 3D scene may be a part of a media (sound) program. For example, the scene may be a part of an audio/video (A/V) program, such as an extended reality (XR) environment, video game, motion picture, a live broadcast, live communication (e.g., video conference call), etc., where the scene may include a visual (e.g., virtual) environment with the listed elements, as well as including audio objects (audio components) of the environment, where a listener at a listener position within the 3D scene may perceive the sounds of the 3D scene. The 3D scene may include one or more audio objects (sound sources), such as a tour guide 145 who may be speaking to a passenger 146, both of which are on the tour bus 143, an exhaust 144 of the tour bus 143 sound of which may be heard by the pedestrian 147, and the pedestrian 147 who may be speaking to the passenger 146. In which case, when the 3D scene is spatially rendered (e.g., by a decoding side), the positions of the sound sources may be perceived by a listener based on the listener's position and/or orientation within the 3D scene.

The second stage 141 shows radiation patterns of the audio objects within the 3D scene 152. Specifically, this stage shows positions of the audio objects within the 3D scene, which may include locations and/or orientations of the objects within the 3D scene. For instance, this stage shows a tour guide position 150a with a radiation pattern 151a of the speaking tour guide 145 directed towards the passenger position 150d, an exhaust position 150c of the exhaust 144 that is making noise with a radiation pattern 151c directed towards a pedestrian position 150b of the pedestrian 147, and a radiation pattern 151b of the speaking pedestrian 147 directed towards the passenger position 150d. In which case, each of the dotted arrows may represent a look direction of a respective radiation pattern that may be directed away from its associated position and towards another position within the 3D scene. In one aspect, the positions of the audio objects may be with respect to one or more reference points, such as the global scene origin 148. In another aspect, the look directions may indicate the orientation of a corresponding sound source. The orientations may be with respect to one or more coordinate system axes within a coordinate system of the 3D scene. For example, the look directions include: ψ that is the orientation of radiation pattern 151a, λ that is the orientation of the radiation pattern 151c, and Θ that is the orientation of radiation pattern 151b. Each of the orientations may be with respect to coordinate axes of a global coordinate system, where the global scene origin 148 may be the origin of the system.

Figure 12:
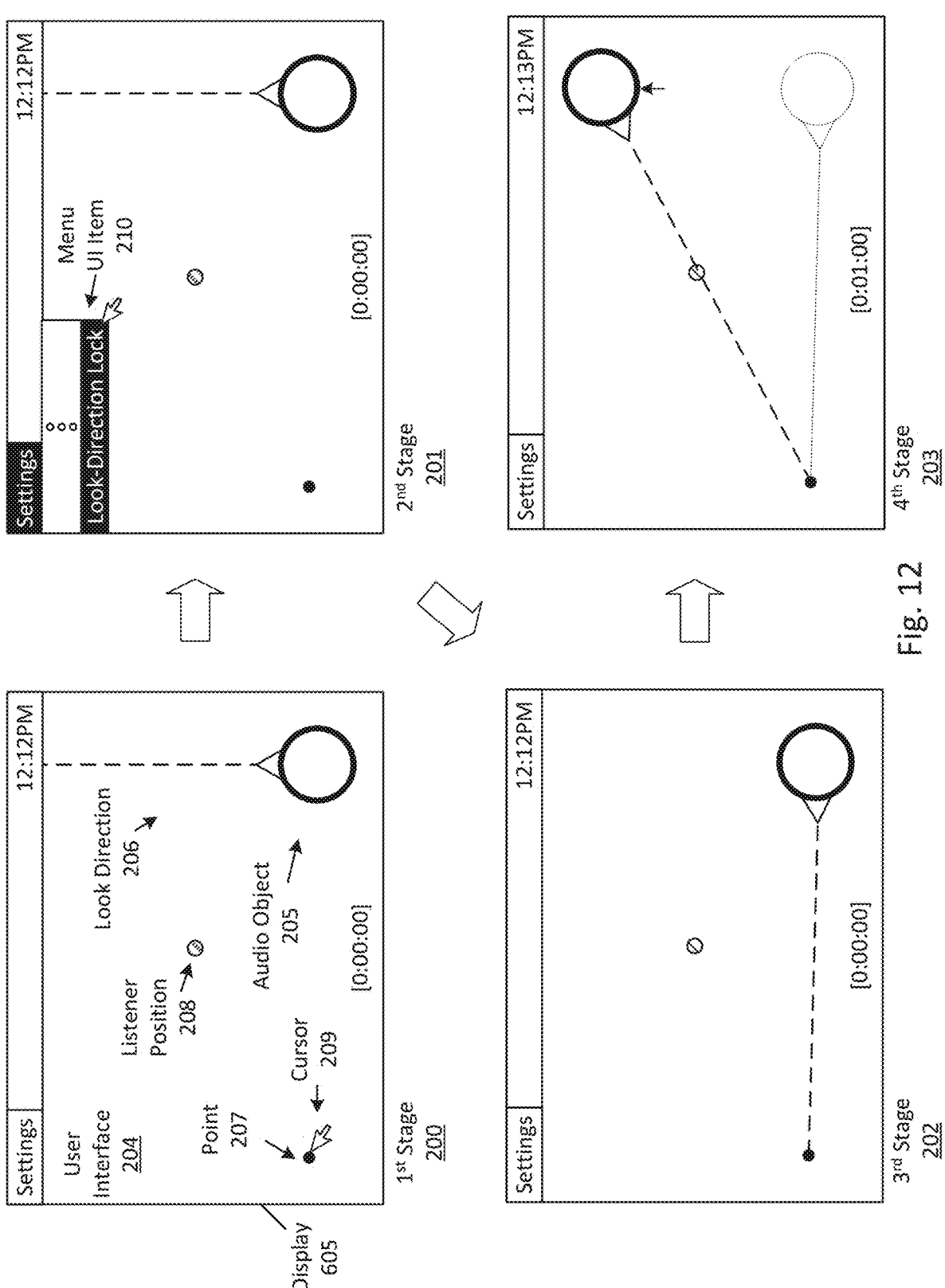
FIG. 12 shows several stages of a user interface through which a user may select a location within the 3D scene towards which an audio object remains fixed as movement occurs within the 3D scene.

In one aspect, the audio system may determine the look directions of the radiation patterns. For instance, an author of audio content may define a location towards which the look direction of an audio object is to be fixed during playback of the audio content. For example, the author may define the location through a user interface (UI) of the audio software application, as shown in FIG. 12 for example. In another aspect, the audio system may define the location automatically (e.g., without user intervention). Once the location towards which the radiation pattern is to be directed, the audio system may determine the orientation (e.g., as an orientation vector) between the sound source and the location within the 3D scene, such as Θ for radiation pattern 151b. More about determining the look directions is described herein.

The third stage 142 shows that the tour bus 143 is driving away from the pedestrian 147. In which case, the audio system may determine whether any look directions are to be updated based on the movement within the 3D scene so as to ensure that the look directions remain fixed upon their corresponding points. In this case, the audio system has determined that the look directions of the radiation patterns 151b and 151c are to be updated, and then generates new orientations (e.g., orientation parameters) as Θ' and λ', respectively, which ensure that radiation patterns 151b and 151c remain fixed upon positions 150d and 150b, respectively. As shown, the look direction, ψ, of radiation pattern 151a has remained the same, since the orientation of the tour guide 145 pointing towards the passenger 146 has not changed with respect to the global reference coordinate axes. As a result, the audio system may be capable of updating look directions without requiring the author to perform the updates manually.

FIG. 10 is a block diagram of the audio system (which hereafter may be referred to as "system") 100 that includes at least a media content authoring device 600 that locks (or fixes) a look direction of a radiation pattern to a point within a 3D scene according to one aspect. The media content authoring device (hereafter may be referred to as "authoring device") 600 may be any type of electronic device that may be capable of authoring a media (e.g., video and/or audio) program, such as a desktop computer, a mobile phone, a laptop, etc. In one aspect, the authoring device may be (or include) the encoding side device that may be capable of encoding and transmitting a bitstream having media content and/or metadata to a playback (decoding side) device, as described herein.

The audio authoring device may include a network interface 601, a controller 602, a non-transitory machine-readable storage medium (or memory) 603, an input device 604 and a display 605. In one aspect, the device may include less or more elements, such as not having input devices or including multiple displays. In one aspect, the input device may be separate from the authoring device and may be communicatively coupled (e.g., wired or wireless connection). The controller 602 may be (or include) a special-purpose processor (e.g., one or more processors) such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller may be configured to perform digital signal processing operations and/or networking operations described herein.

The memory 603 includes an authoring software program 606 and one or more media programs 608, which may include media content 609 and/or metadata 610. In one aspect, the media program may include any type of program, such as a motion picture, musical composition, video game, etc. The media program may include video content and/or audio content of a piece of media content. In one aspect, the audio content may include one or more acoustic 3D scenes of the media program 608, where each scene may include one or more audio objects, and/or the video content that may correspond to visual elements of the acoustic scenes. For example, referring to FIG. 9, the video content may include visual representations of the tour bus 143 and the pedestrian 147 in an environment, such as a bus station, while the audio content may include audio objects associated with sound sources within the environment. The metadata 610 may include information related to the media content. For example, when the media content includes one or more audio objects of a sound program, the metadata may indicate the objects' locations and orientations (e.g., orientation parameters such as yaw, pitch, and roll). As shown, the media content and metadata may be stored locally within memory 603. In another aspect, at least a portion of the media program may be stored on an external source, such as a remote server.

The authoring software program 606 may be configured to allow a content creator to author (revise) media programs 608. In which case, the software program may provide a user interface (UI), which may be displayable on the display 605 to allow the user to create content by providing user input through the input device 604 (e.g., a mouse, keyboard, touch-sensitive display screen). For example, referring to FIG. 9, the content creator may cause the tour bus 143 to move from the second stage 141 to the third stage 142, via user input. In one aspect, the authoring software program may allow a user to select one or more parameters for one or more audio objects within an acoustic environment, such as a location within the acoustic environment, and a radiation pattern. The authoring program 606 may also allow a content creator to define a look direction of an audio object within the 3D scene. The authoring program may allow a content creator to create multiple scenes within a media program, where each scene may include one or more audio objects. Once authored, the software program may store the media program in memory, store it at an external source, and/or stream it to one or more other devices for playback.

With authoring a media program, the authoring software program 606 may set (or define) the metadata associated with the media content. For instance, the authoring software program may be configured to identify (generate) a set of one or more orientation parameters for an audio object to direct an associated radiation pattern towards a point within the 3D scene. In one aspect, the orientation parameters may include any data that may indicate the orientation (look direction) of a radiation pattern of an audio object with respect to one or more (reference) coordinate axes. For example, with respect to radiation pattern 151*b* of FIG. 9, the orientation parameters may include an orientation vector of Θ with respect to one or more global coordinate axes of a coordinate system of the 3D scene having the global scene origin 148 at its origin. For example, the orientation parameters may include Spherical coordinates within a Spherical coordinate system, such as an azimuth and/or an elevation. In another aspect, the parameters may include one or more quaternions, where each quaternion may include four normalized parameters. In another aspect, the orientation parameters may include parameters such as yaw, pitch, and roll, where each are associated with a particular axis of the coordinate system of the 3D scene.

The look direction lock 607 of the authoring software program may be configured to determine a look direction of one or more audio objects and to lock the look direction towards a point within the 3D scene to maintain an orientation of the audio objects regardless of motion of the point or the audio object within the 3D scene. As described herein, the authoring software program may allow a user to select a look direction for an audio object. For example, the user may select a point (or object) through the input device 604 within a UI of a 3D scene towards which the user wishes the look direction of an audio object to be locked, regardless of motion of either the point or the audio object. More about selecting a look direction is described herein. The look direction lock 607 may be configured to determine the point (or location) within a 3D scene towards which a sound source associated with an audio object is to be orientated within the 3D scene, and may provide one or more UI items, which when selected by the user through the input device 604 may lock the look direction towards the point. More about the UI of the authoring software program is described herein.

The authoring program may be configured to determine a point (or location) within a 3D scene towards which a sound source associated with an audio object is to be oriented within the 3D scene. As described herein, this determination may be based on user input through an input device 604. In another aspect, user input may be received through other methods, such as through a voice command captured by a microphone of the authoring device 600. In either case, an author may define the point at a beginning of a 3D scene of a sound program, such that during playback of the 3D scene radiation pattern of the sound source remains focused on the point. More about the author defining the point is described herein. In another aspect, the point may be defined based on media metadata 610 of the media program 608. In this case, the metadata 610 may specify locations and/or directions within the 3D scene towards which sound sources are to remain fixed towards.

In another aspect, the look direction lock 607 may determine the point towards which the sound source is to remain fixed based on the media program 608, which is currently being authored or is to be authored. In particular, the lock 607 may perform an object recognition algorithm upon the media content 609 to determine a look direction of a sound source. Referring to FIG. 9, the look direction lock may determine that the pedestrian 147 is looking upwards and towards the passenger 146 based on the angle of the pedestrian's head and/or the gaze of the pedestrian. As a result, the lock may determine that the radiation pattern 151b of the pedestrian is to be fixed towards the passenger position 150d.

In one aspect, the point towards which a look direction of a radiation pattern is to remain fixed may be a static location within the 3D scene. Referring to FIG. 9, the point may be a location on the ground or in front of the tour bus 143. In another aspect, the point may be another audio object within the 3D scene. This is the case with respect to the radiation pattern 151c, which has a look direction directed towards the pedestrian position 150b. As another example, the point may be a mobile object within the 3D scene, such as the tour bus 143. In another aspect, the audio object associated with the look direction may be static or may be mobile. For example, referring to FIG. 9, the pedestrian 147 may remain still within the 3D scene, or the pedestrian 147 may move about the environment. In either case, the authoring program may maintain the look direction of the radiation pattern 151b towards the passenger position 150d.

In another aspect, the point may be based on several (static and/or mobile) objects within a 3D scene, and may or may not be directed towards any one of the particular objects. For example, when there is one audio object, which may be the case when two people are having a one-on-one conversation, a look direction of one person may be fixed on the other (e.g., based on user input). In the case, however, of one person talking to a crowd of (e.g., talking) people, the look direction of the talking person may be directed to one of the people in the crowd or a location based on the crowd. For example, the point may be within a region (or area) surrounded by the (audio) objects within the 3D scene. The look direction lock 607 may be configured to generate the region based on locations of the audio objects within the 3D scene. For instance, the lock 607 may generate the region as a polygon, where each of the audio objects is a vertex. In which case, the point within the region may be at a centroid of the region. In one aspect, the region may be generated by the identifier based on a group of objects, which may be user-selected. In another aspect, the region may be user specified. For example, the user may draw a region within the 3D scene within a UI. In another aspect, the point within the region may be user specified (e.g., being other than the centroid of the region).

The look direction lock 607 may automatically (e.g., without user intervention) update the look direction so as to lock the look direction of the radiation pattern towards a point based on (responsive to) movement of the point and/or of the audio object associated with the look direction within the 3D scene over a period of time. In particular, the lock 607 may update the look direction during at least a portion of a playback time of the media program 608. In one aspect, the portion of playback may correspond to movement within the 3D scene. In which case, when the scene changes within the media program (e.g., moving from the bus station to inside a building), look directions may be removed or may remain fixed, based on whether the audio objects and/or point are within the next scene.

Referring to FIG. 9, the lock 607 may determine that the tour bus 143 has begun to drive away at the third stage 142, which may be a period of time after the second stage 141. This determination may be based on an analysis of the media program. For example, the look direction lock 607 may determine that the tour bus has moved from its original location based on a visual analysis of the video content. As another example, the lock 607 may determine that the tour bus has moved based on an acoustic analysis of one or more audio objects, where movement may be identified by determining that the audio object associated with the talking tour guide has moved away from the global scene origin 148, for example. In another aspect, the lock 607 may determine that a point towards which a look direction is moving based on the media metadata 610. For instance, when the point is another audio object, the media metadata may indicate that that audio object is to move within the 3D scene. Upon identifying movement, the look direction lock 607 may update the orientation parameters of the audio object's look direction based on the movement such that the look direction remains focused onto the point. The parameters may be updated by determining the difference between its position with respect to the position of the audio object, and either its new position with respect to the original position of the audio object or its original position with respect to the new position of the audio object.

As described thus far, the point towards which the look direction is locked may be associated with a visual representation of an object within a 3D scene, such as a person, or another sound source. In another aspect, the point may be associated with one or more characteristics of the object (or sound source). For example, the orientation of a radiation pattern may follow a direction of a trajectory of an object within the 3D scene. In which case, the look direction lock 607 may be configured to determine a trajectory of an object (e.g., based on metadata of the object and/or based on object recognition), and may be configured to update the look direction based on the (e.g., direction of the) trajectory. In another aspect, the look direction lock may determine the orientation parameters relative to the object's trajectory direction. In this way, for example, a radiation pattern associated with a car's engine may follow the car's trajectory, or its exhaust pipe orientated towards the rear along with the trajectory.

As described thus far, the look direction lock 607 may lock the look direction towards a point, which may be a static location, a mobile object, or a static (or mobile) sound source. In another aspect, the look direction lock 607 may adjust the point when the look direction is focused upon multiple objects. Returning to the previous example with the crowd of talking people, some over time may move while others may remain still. In which case, the lock 607 may be configured to generate a new region based on movement of mobile objects, and may adjust the point as the centroid of the region changes.

In one aspect, when orientation parameters are updated, the look direction lock 607 may store the parameters as in metadata 610, such that when the authored media program is spatially rendered, the metadata may be used to define look directions of radiation patterns during playback.

Figure 11:
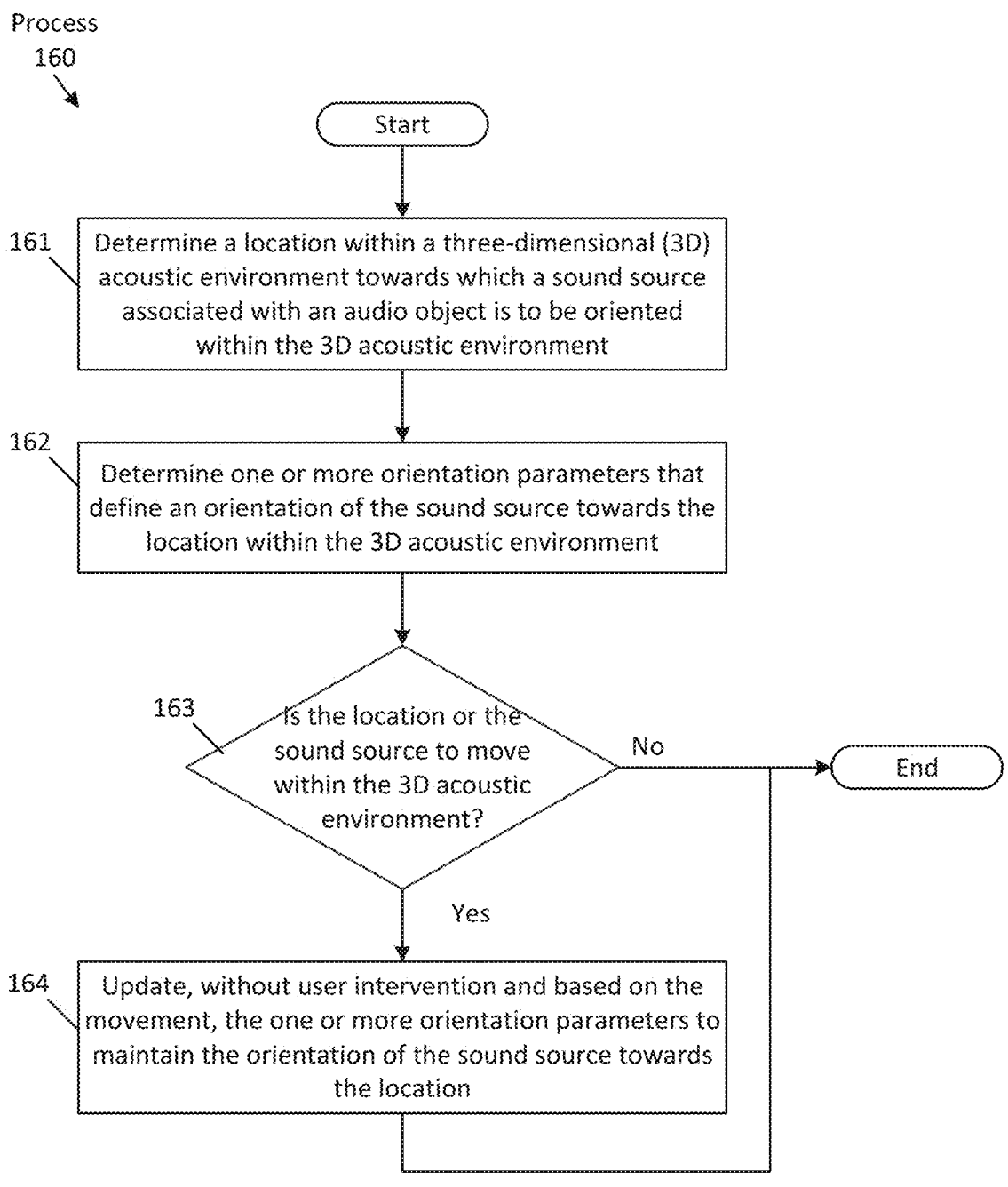
FIG. 11 is a flowchart of one aspect of a process at a media content authoring device for automatically fixing an orientation of an audio object towards a location within the 3D scene.

FIG. 11 is a flowchart of one aspect of a process 160 at a media content authoring device (e.g., an encoding side) for automatically fixing an orientation of an audio object towards a location within the 3D scene. In particular, the operations of this process may be performed by (e.g., the look direction lock of) the authoring software program 606 that is being executed by one or more processors of the device 600. The authoring program may receive an audio object of a media program, the audio object having a radiation pattern for projecting sound towards a look direction of the audio object within a 3D scene. For instance, a content creator may define the audio object within the 3D scene, or the audio object may be an existing sound source within the scene. The process 160 begins with determining a location within a 3D acoustic environment towards which a sound source associated with an audio object is to be oriented within the 3D acoustic environment (at block 161).

In particular, the authoring software program 606 may be configured to determine a location within the 3D environment where a look direction of an audio object is to remain fixed (locked) regardless of movement within the 3D environment. This location may be a point within the 3D environment that may be assigned by the authoring program. In one aspect, this determination (assignment) may be based on received user input that indicates the location. In particular, the authoring program may display a user interface of a (e.g., 3D) acoustic environment that includes a sound source. The authoring program may receive a user selection, via an input device, of the location within the UI, the location towards which the sound source is to be oriented within the 3D acoustic environment. As an example, the sound source may be associated with an avatar of a user within the 3D acoustic environment.

The authoring program determines one or more orientation parameters that define an orientation of the sound source towards the location within the 3D acoustic environment (at block 162). In particular, based on the determined location, the authoring program may determine the orientation or look direction of a radiation pattern from the sound source to the location. In one aspect, the orientation may be with respect to a global reference coordinate system (e.g., one or more axes) within the 3D environment. From the orientation, orientation parameters, such as a quaternion may be determined. The authoring program may store the one or more orientation parameters within the (e.g., metadata of the) media program that is being authored by the content creator.

In one aspect, the authoring program may perform these operations for each or at least one audio object within the 3D acoustic environment such that individual orientation parameters may be determined. In one aspect, the authoring program may be configured to determine orientation parameters only for audio objects having look directions that are to be fixed at a particular point or location within the 3D environment.

The authoring program determines whether the location or the sound source has moved within the 3D acoustic environment (at decision block 163). In particular, the look direction lock may determine whether an audio object within the 3D environment has moved with respect to a reference point, or whether the point towards which the look direction of the audio object is locked has moved. This movement may occur within the media program after a period of time from when the look direction was locked. As described herein, this determination may be based on media metadata associated with the media program that is being authored and/or may be determined based on an analysis of the media program, such as determining whether a visual representation of the audio object has moved. As another example, when the point towards which the look direction is locked is an object, such as a virtual object within the video content, the look direction lock may determine whether the virtual object has moved. As yet another example, when the location is that of another audio object, the look direction lock may determine whether that audio object has moved based on positional data associated with that audio object.

If so, the authoring program updates, without user intervention and based on the movement, the one or more orientation parameters to maintain the orientation of the sound source towards the location (at block 164). In particular, the look direction lock may automatically update one or more of the orientation parameters, without requiring an author of the audio content to manually adjust the look direction of the audio content through a UI of the authoring program, for example. As an example, when authoring the 3D scene 152 of FIG. 9, when the tour bus 143 moves from its position in the second stage 141 to the third stage 142, the look direction lock 607 may automatically update look directions, thereby alleviating the need for the content creator to manually update the look directions between the two stages. Returning to the previous example, the orientation may include a front-facing direction of the avatar of a user, and the radiation pattern may be of speech of the avatar. In one aspect, to update the orientation parameters, the look direction lock may determine positional data of the location and the sound source with respect to a reference point before the movement and may determine the positional data after the movement, and then update the orientation parameters based on the change in positional data. The look direction lock 607 may then store the updated orientation parameters to correspond to the movement at that particular time within the media program (e.g., time stamped).

In one aspect, the authoring program 606 may repeat at least some of the operations of process 160 for each scene within a media program. As a result, the authoring program fixes the orientation of the sound source towards the location (e.g., of another audio object or a group of audio objects) responsive to receiving user input such that regardless of the motion of the location (e.g., movement of the object(s)) or the sound source, the orientation of a radiation pattern of the sound source remains directed towards the location. The orientation may be fixed during a duration of the media program, such as while the content creator authors this particular scene.

As described thus far, the look direction may be fixed upon a point within the 3D environment so that the radiation pattern of the audio object may always be oriented towards the point. In another aspect, the authoring device may be configured to update the point at which the look direction is fixed based on an analysis of the media program, as described herein. As a useful illustration, a person's gaze may be oriented while navigating social interactions in a large gathering of people. On arrival at the event the focus may be oriented toward the staff of a coat check, then it may shift to a point on the horizon in roughly the position of a stage where live entertainment may be occurring, then as the party guest moves amongst the crowd their focus may orient toward a group of friends of coworkers also attending the event, and finally, for the purposes of this example, the orientation may be shifted onto an individual from the previously identified group with whom the party guest wants to converse. In one aspect, at various times during this scene, the authoring device may determine whether the look direction should be adjusted. For example, the authoring device may monitor the gaze of the party guest to determine when the gaze shifts from the staff of the coat check to the horizon. Upon making this determination, the authoring device may determine the location and update the orientation parameters accordingly.

FIG. 12 shows several stages 200-203 of a user interface (UI) 204 through which a user may select a point within the 3D scene towards which an audio object remains fixed as movement occurs within the 3D scene. In particular, the UI 204 may be a part of the authoring program 606 displayed on the display 605. Each of the stages shows the UI 204 of a top-down view of a 3D scene that includes an audio object displayed on the display. The UI also includes a listener position 208, which may be static within the 3D scene. In one aspect, the user interface may be of an audio content authoring application that allows an author to create media content, as described herein.

The first stage 200 shows an author selecting a point 207 within the UI 204 towards which a look direction of the audio object 205 is to be fixed. In particular, this stage shows that the look direction 206 is towards the right-hand side of the listener position 208, such that if the listener at the position 208 were forward facing, the radiation pattern of the audio object would be perceived by the listener to originate from behind and toward the right of the listener. In one aspect, the look direction 206 may be predefined (e.g., based on metadata of the media program) at this stage. In another aspect, the look direction may have been previously defined (and fixed) by the user. In this case, the look direction 206 may be directed towards a horizon.

In one aspect, the authoring program 606 may display the UI of the 3D scene that includes the audio object as a sound source, where the authoring program 606 may receive user input. In this case, the UI 204 includes a cursor 209, which may be controlled through an input device such that the user may move the cursor 209 to the point 207 and a user selection through the input device of the point within the UI may provide an indication to the authoring program 606 that this location is where the audio object is to be fixed. In another embodiment, the display may be a touch-sensitive display, where the user input may be a tap on the display of the point 207.

The second stage 201 shows the user selecting a menu UI item 210 with the cursor 209 to lock the look direction 206 of the audio object 205 onto the point 207. In particular, the authoring program 606 may receive a user selection through an input device (e.g., a mouse) of the menu UI item 210 that will lock the orientation of the audio object with the point. The third stage 202 shows the result of the user selection of the menu UI item 210, which is the look direction 206 turning roughly 90° to the left and locking onto the point 207.

The first three stages show the 3D scene of a media program within the UI 204, while the media program is at a starting (beginning) time "[0:00:00]". The fourth stage 203 shows that one minute of the media program has elapsed, showing "[0:01:00]", and as a result, the audio object 205 has moved from its initial position to a new position in front and to the right of the listener position 208. This movement may be based on user input (e.g., the user selecting and dragging the audio object 205 from its original position to its new position), or may be performed automatically by the media program (e.g., based on movement of a corresponding visual representation in video content). As the audio object 205 has moved, the look direction 206 has remained fixed on the point 207.

Thus, as the audio object is translated to a different position in a coordinate system over time, the orientation parameters that indicate the look direction of the radiation pattern of the audio object may be updated continuously and automatically by the authoring program 606 to maintain orientation toward the point. In one embodiment, the updated orientation parameters may be stored in metadata associated with the media program as movement occurs in order to update the position/orientation of the audio object. In one aspect, the orientation parameters May be updated at a granularity matching (or better than) a timing resolution of the system such that as the object position changes, the orientation parameters may be updated and stored in memory.

In one aspect, the specified point may remain stationary within the 3D scene or move at various times during playback of the media program. In another aspect, the look direction may be set to various points within the 3D scene during at least a portion of playback. For example, the look direction may be locked to a point, which may be a static location, another audio object, multiple audio objects, etc., over a period of time. After that period of time, the point towards which the look direction is locked may switch to another point. For example, after an additional ten minutes passes in this example, the look direction 206 may be directed to another point within the UI 204. In one aspect, this different point may be user set, or may be determined (selected) automatically by the authoring program 606. For example, when the audio object is associated with an avatar of a user within an XR environment, the authoring program 606 may determine that a gaze of the avatar's eyes focus from point 207 to the other point.

As shown therein, this figure illustrates a user setting the point within a two-dimensional (2D) representation of the acoustic environment of a media program. In another aspect, the UI 204 may illustrate the acoustic environment in a 3D coordinate system (to show the 3D scene), and in which case a user-selection of a point within the 3D coordinate system may be selected.

Figure 13:
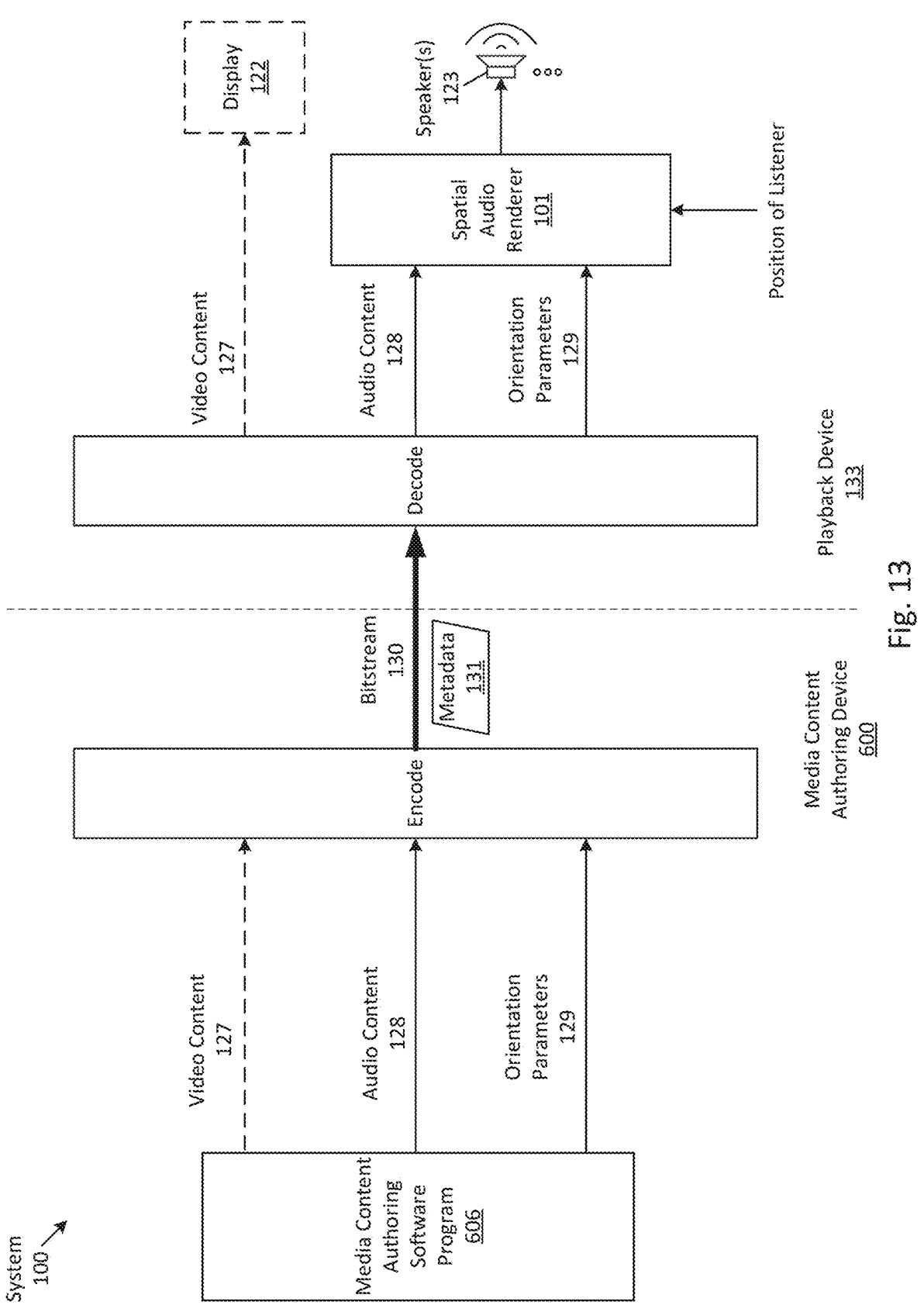
FIG. 13 is a block diagram of an audio system that includes an encoding side that locks a look direction of a radiation pattern to a point within the 3D scene and provides metadata to a decoding side to spatially render the sound program according to one aspect.

FIG. 13 is a block diagram of the audio system 100 that includes the media content authoring device 600 as an encoding side device (or encoding side) that may be configured to lock a look direction of a radiation pattern to a point within the 3D scene and provide metadata to a playback device as a decoding side to spatially render the media (sound) program according to one aspect. As described thus far, the media content authoring software program 606 may be configured to allow a content creator to create a media program and to lock a look direction of an audio object of the media program to a point during at least a portion of the playback of the media program. This playback may occur at the authoring device, or may occur at another device, such as the playback device 133. In this case, the authoring device may be configured to provide the media program, along with metadata to instruct the playback device how to spatially render the media program.

The authoring device 600 may be configured to encode the audio content 128 (e.g., one or more audio objects) and/or the optional video content 127 of a media program 608 according to a codec, such as the Moving Picture Experts Group (MPEG) standard, into a bitstream 130, which may be transmitted to the playback device 133 over a network (e.g., the Internet). In one aspect, the authoring device may provide metadata 131 to the playback device (e.g., encoded within the bitstream 130 or provided separately), which may include the orientation parameters 129 generated by the authoring software program and/or any other metadata 610 associated with the media program. In one aspect, the authoring device may provide the metadata which may include positional data that may include positions of sound sources within the 3D space and has one or more orientation parameters as an initial configuration of a 3D scene for playback by the playback device. As a result, the playback device may be configured to render the one or more audio objects of the audio content according to the orientation parameters.

As described herein, other metadata 610 associated with the media program that is to be transmitted may be included as the metadata 131 within the bitstream (or transmitted separately). In one aspect, the positions of the audio objects may be added into the metadata 131 as positional data, which may be used by the playback device 133 to spatially render the 3D scene. For example, locations of audio objects may be coordinates of a coordinate system, such as Cartesian or Spherical coordinates with respect to an origin, such as the global scene origin 148 of FIG. 9. Orientation parameters may be added as rotational data that indicates a rotation of a look direction of a radiation pattern projecting from an audio object. The rotational data may include parameters, such as yaw, pitch, and roll. When the coordinate system is a Spherical coordinate system, the origination parameters may include spherical coordinates, such as an azimuth and an elevation to indicate the look direction. In another embodiment, the parameters may include one or more quaternions as four normalized parameters.

In one aspect, the positions of the audio objects and/or their respective (radiation pattern) orientations of the 3D scene may be provided by the playback device as metadata to instruct the playback device how to spatially render a media program of the 3D scene. For example, positions of objects within the 3D scene may be encoded as positional metadata that includes a scene tree structure that describes relationships between positions of audio objects and one or more origins within the 3D scene. As shown in FIG. 9, the scene may include the global scene origin 148, which may be a zero vector of a coordinate system (e.g., Cartesian, Spherical, etc.) of the 3D scene, and may include one or more other origins (or sub-origins) associated with sub-scenes within the scene. For example, the tour bus 143 may be a sub-scene with a sub-origin at the tour bus position 149. In which case, metadata of the tour guide position 150*a* and the passenger position 150*d* may be encoded with respect to the tour bus position 149. In addition, the tour bus position 149 and the pedestrian position 150*b* may be encoded with respect to the global scene origin 148.

Orientations of the audio objects may be added to the metadata 131 as one or more orientation parameters. In one aspect, the orientations of the audio objects may include orientations of look directions of corresponding radiation patterns originating from their positions within the 3D scene, which may be with respect to a coordinate system, as described herein. In one aspect, these orientations may take into account locked look directions during the authoring of the media program. For example, orientation parameters of a radiation pattern of an audio object may result in the radiation pattern following or remaining fixed upon an object, as perceived at a listener position, during rendering and playback of the audio content.

In one aspect, the authoring device 600 may provide updates of at least some positional data to the playback device 133. In particular, the authoring device may provide, subsequent to providing the initial metadata, an updated set of parameters such that the playback device may adjust orientation of the sound source during rendering. For example, upon determining that an audio object that has a look direction pointed towards another audio object within the 3D scene has moved, the authoring device 600 may provide the updated orientation parameters 129 as additional metadata. In one aspect, these updates may require less bandwidth than an initial configuration of the 3D scene, which may include positional data of all (or at least some) audio objects within the 3D scene. In another aspect, the updates may be provided in real-time, when the media program is a live program that may be streamed to the playback device.

The playback device 133 may be configured to receive the bitstream 130 and the metadata 131 (which may be encoded in the bitstream), decode the audio content 128 and the video content 127 of a media program, and may use the metadata 131 to spatially render the audio content 128. In particular, the received metadata instructs the playback device 133 how to spatially render the audio content 128, which may be based on the position of the listener. For instance, the metadata may include a scene graph that describes locations of audio objects within a 3D acoustic scene, and may include orientation parameters that indicate the look direction of radiation parameters of one or more of those audio objects. The spatial audio renderer 101 may be configured to spatially render the audio content according to the metadata with respect to the position of the listener to produce one or more audio signals that includes the audio content for playback through one or more speakers 123. The resulting sound output provides the listener with a perception of being within the 3D scene and experiencing sound sources with respect to the listener position. In one aspect, the listener position may be the position of the listener within the 3D scene. For example, in the case in which the 3D scene of the media program is an XR environment in which (e.g., an avatar of) the listener is participating, the position of the listener may be the location at which the avatar is located within the XR environment.

In one aspect, the playback device 133 may (e.g., periodically) receive updated metadata 131 from the authoring device 600, which may indicate updated positional data of one or more objects within the 3D scene and/or updated orientation parameters. The spatial audio renderer 101 may use the updated orientation parameters to redirect the look direction of a radiation pattern based on movement within the 3D such that the listener may perceive the radiation pattern remaining directed towards a particular point within the 3D scene.

In one aspect, when a listener is watching a 3D scene, such as the 3D scene 152 of FIG. 9, the listener may be located at a viewing position within the global scene, such as being next to the pedestrian position 150*b*. The spatial renderer 101 may be configured to use the positional data received within the metadata 131 to render the audio content 128 such that sound may be perceived in agreement with the video content 127, which may show the tour bus 143 and pedestrian 147. As a result, it is important to use dynamic updates of sound source's positional data as movement occurs within the 3D scene 152. By locking a look direction for at least some audio objects, orientation parameters of those objects may be updated automatically to account for the displacement of their coordinates relative to the position at which the look direction is fixed. This allows a content author to maintain a desired directionality for a radiation pattern of any audio object without having to manually update the corresponding orientation parameters for objects, such as the objects that move over time within a 3D scene.

In one aspect, the optional video content 127 may be decoded and played back through the display 122. In one aspect, the video playback may be synchronized with the audio content playback.

In one aspect, the system 100 may perform look direction lock operations of a media program in real-time. In which case, the operations described herein may be continuously (or periodically) performed upon a stream of audio content of the media program. For example, operations to determine a point towards which a look direction is to be locked may be determined from (or before) a beginning of a media program (or at a starting time at which the media program is to be streamed). Once streaming starts, the authoring device may adjust orientation parameters of the look direction as movement within a scene of the streamed media program occurs so as to maintain the look direction of an audio object, as described herein. In one aspect, the authoring device may continue to update orientation parameters until an end of the media program (or a stopping time at which the media program is no longer streamed in real-time). In some aspects, the authoring device 600 may periodically update or change the point at which the look direction is locked based on various criteria, as described herein. For example, the author of the media program may adjust the point towards which the look direction is locked between scenes of the media program. In one aspect, the authoring device may be configured to playback the streamed content or may be configured to encode and transmit the content for decoding and playback by the playback device 133, as described herein.

As a result, the operations may be performed during a live broadcast of a media program, such as a live audio communication (e.g., live video conference call, an audio call, etc.), or a live soccer match. For this example, the authoring device 600 may be configured to receive the sound program as a live audio (and/or video) broadcast and may be configured to determine acoustic characteristics of audio objects within the live broadcast, such as a referee and a player within the match. Upon determining audio objects, the characteristics may be determined such as a look direction, the position of the audio objects within the scene, and radiation patterns. The authoring device may be configured to lock one or more look directions, as described herein. For the soccer match example, the authoring device may lock a look direction of the referee in a direction away from a sideline and towards a direction which the referee is front facing. As a result, when the sound scape is spatially rendered at the authoring device or the playback device, a listener may perceive the referee speaking away when the listener's position is at the sideline.

In the case of a live audio communication, the authoring device may be configured to capture audio using one or more microphones 302 and/or capture video using a camera 301, and may (encode and) transmit the audio/video to the playback device. In doing so, the authoring device may be configured to determine one or more sound sources within the audio, and may be configured to determine radiation patterns and/or corresponding look directions based on an analysis of the audio and/or video or based on user input, as described herein. In which case, the playback device may use metadata produced during the live audio communication to spatially render the audio content.

As described thus far, the authoring device may be configured to lock a look direction by updating one or more orientation parameters of an audio object such that its orientation remains focused upon a point or location within a 3D scene during playback of audio content. In particular, the authoring device updates the parameters and may store those parameters along with the media program and/or may provide the updated parameters to the playback device, which may then apply the updated parameters during spatial rendering of the audio content. These updated parameters may be received as part of positional data that indicates a position and orientation of an audio object into metadata. As a result, the operations described herein may be useful in application areas such as content authoring, and content coding, delivery, and spatial rendering.

As described herein, the bitstream 130 may already include audio object metadata where each audio object may be identified by the playback device, for example by using a unique identifier such as an enumeration and where the object metadata may include the object locations. For instance, the audio object's location may be included in positional data that has the location of the audio object with respect to an origin within the 3D scene, and may include the orientation of the audio object as one or more orientation parameters.

In one aspect, look direction lock metadata may be preserved during audio coding and rendering. This metadata may be provided by the authoring device to the playback device for spatial rendering, where it may indicate the location within a 3D scene towards which a look direction of a radiation pattern of an audio object is to remain oriented as the location or audio object moves during spatial rendering. In one aspect, this look direction lock metadata may be included within the metadata 131 or may be separately provided to the playback device. Providing an efficient description of the radiation pattern orientations may reduce the bitrate when the metadata is encoded and transmitted, because multiple radiation patterns may reference a same location within the 3D scene specified by a look direction lock metadata instead of needing to transmit individual orientation parameters for each radiation pattern.

FIG. 14 is a flowchart of one aspect of a process 170 at the authoring device 600 for encoding metadata that indicates a location within the 3D scene towards which the radiation pattern of an audio object remains oriented during playback of the sound program. The process 170 begins by receiving a sound program that includes an audio object within a 3D scene (at block 171). The authoring device 600 encodes the sound program into the bitstream 130 (at block 172).

The authoring device 600 encodes metadata of the sound program into the bitstream, which may include look direction lock metadata that indicates a location within the 3D scene towards which a radiation pattern of the audio object is to remain oriented as the location or the audio object moves within the 3D scene during spatial audio rendering of the sound program (at block 173). In particular, the authoring device may produce look direction lock metadata that is a structure having a payload indicating the location that the look direction is to be fixed to the playback device, which may be based on user input and/or an analysis of the sound program, as described herein. In one aspect, the look direction lock payload within the metadata may be based on the location or point towards which the radiation pattern is to be fixed towards. For example, the payload may include positional data, such as coordinates of a coordinate system, when the location is a static location within the 3D scene, or may include a reference (e.g., unique identifier) to an object within the 3D scene. More about the content of the look direction lock metadata is describe herein.

The authoring device 600 encodes audio object metadata that includes a reference to the look direction lock metadata that instructs the playback device to lock a direction of the radiation pattern of the audio object onto the location indicated by the look direction lock metadata during spatial audio rendering of the sound program (at block 174). Specifically, the authoring device may determine the point within the 3D scene at which the look direction of an audio object's radiation pattern is to be fixed, and upon making this determination it may determine which look direction lock metadata includes that particular point and then adds a reference for the look direction lock metadata into the audio object metadata. In one aspect, the audio object metadata may include other metadata described herein, such as a corresponding radiation pattern, a location of the audio object within the 3D scene, etc.

In one aspect, at least some of the operations described herein may be optional and/or may be performed in combination with other operations described herein. For example, the operations of block 171 and/or block 172 may be optional.

Figure 15A:
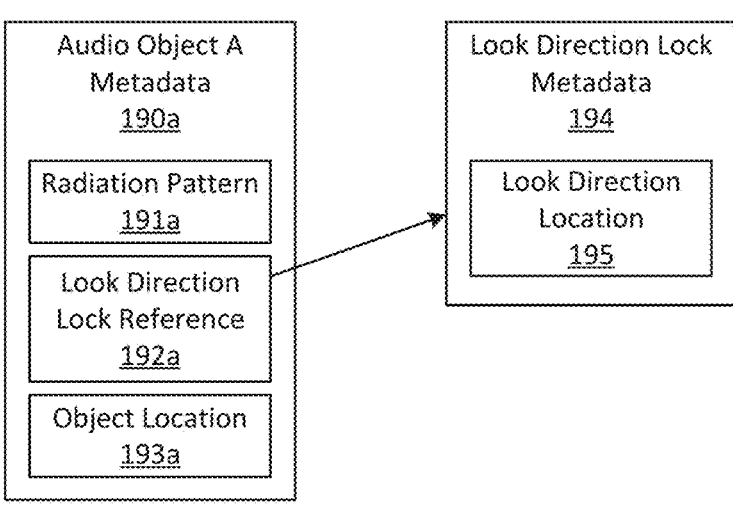
FIGS. 15a-15c include metadata that instructs the decoding side how to direct the radiation pattern of the audio object during playback of the sound program.
Figure 15B:
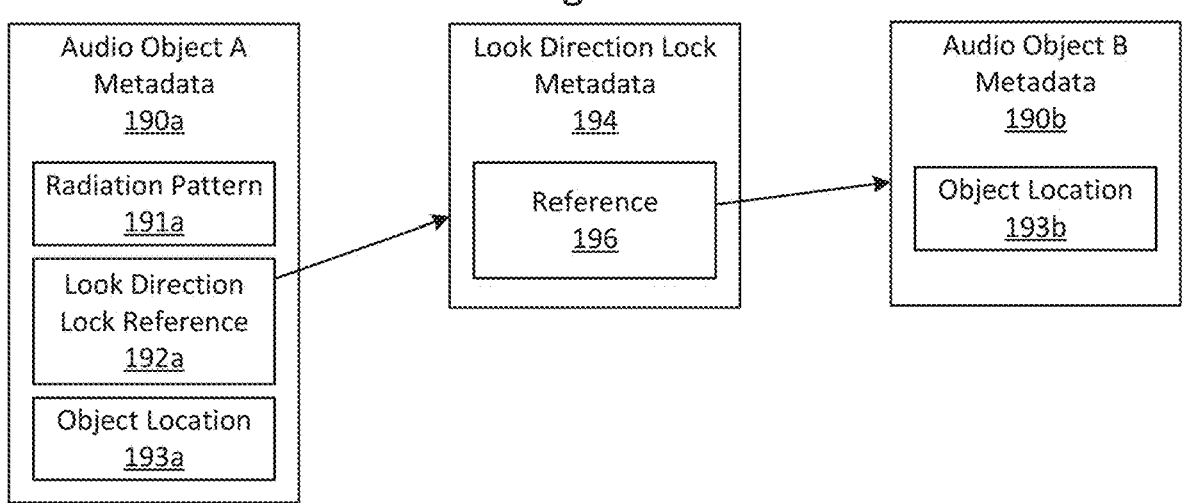
Figure 15C:
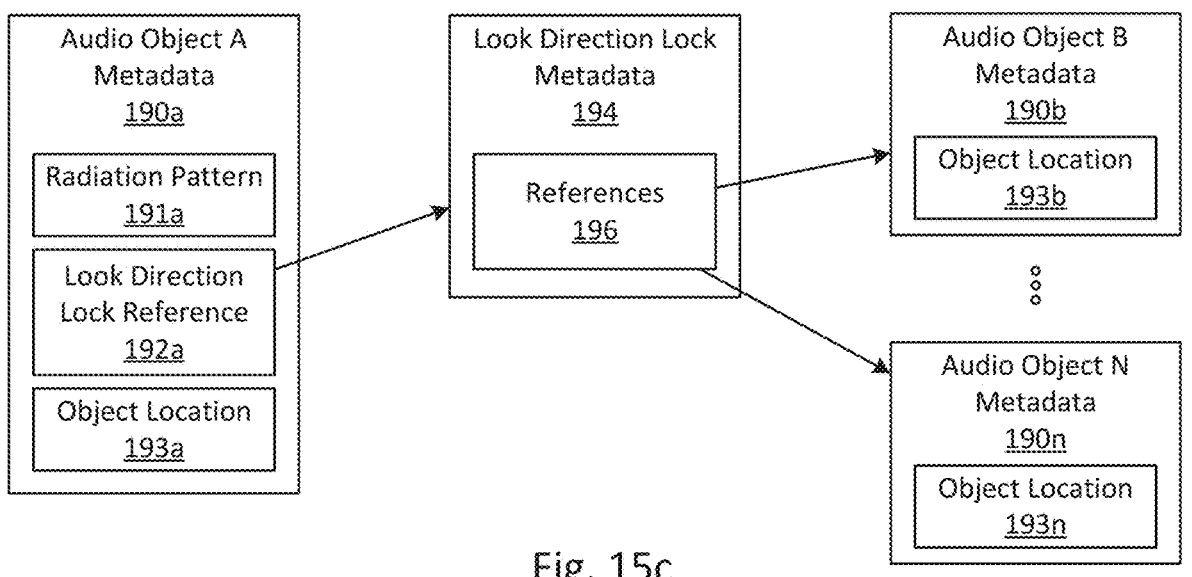

FIGS. 15a-15c include metadata that instructs the playback device how to direct the radiation pattern of the audio object during playback of the sound program. Each of these figures illustrate different examples of the structure or payload of the look direction lock metadata, which indicates a location at which the look direction is to be fixed as the location or the audio object moves during playback by the playback device.

FIG. 15a shows an example of look direction lock metadata for fixing a look direction upon a static location within a 3D scene. In one aspect, a static location may be a point within the 3D scene that may not move with respect to a reference point, such as a global origin. In another aspect, it may be an object, such as a boulder, a location on the ground, a point on a horizon, etc. This figures shows an audio object A metadata 190a and a look direction lock metadata 194. The audio object metadata includes a payload that has a radiation pattern 191a, a look direction lock reference 192a, and an object location 193a. In one aspect, the object location 193a may include at least a portion of the positional data described herein. For instance, the positional data may include a scene graph that describes the location of the audio object A with respect to a reference point of the 3D scene. In some aspects, the audio object metadata may include other information, such as reverb width, pre-delay, etc. The radiation pattern 191a may include a selected index from a dictionary of radiation patterns, which may be used by the decoding side to select a corresponding radiation pattern from a codebook and use the pattern during spatial rendering. The look direction lock reference 192a may include a unique identifier that may be associated with the look direction lock metadata 194. In one aspect, the unique identifier may be generated by the encoding side upon generation of the look direction lock metadata.

The look direction lock metadata 194 includes a look direction location 195 which may be a location within a 3D scene. For instance, the location may be a set of coordinates of the location within a coordinate system of the 3D scene. In one aspect, the location may be coordinates with respect to a reference point within the 3D scene, such as an origin of the 3D scene (made up of a scene graph, as described herein).

FIG. 15b shows an example of look direction lock metadata for fixing a look direction upon another audio object, such as an audio object, within the 3D scene. As described herein, the authoring device 600 may provide metadata that includes positional data of audio objects of the sound program. In addition to providing metadata for audio object A, the authoring device 600 has provided audio object B metadata 190b which includes (at least) the location 193b of object B. As a result, the look direction lock metadata 194 includes a reference (e.g., unique identifier) 196 of audio object B that is at a location within the 3D scene at which the radiation pattern 191a of the audio object A is to be directed. As described herein, the playback device may determine that the location of the look direction is the object location 193b of the audio object B, and therefore orientate the radiation pattern 191a of the audio object A towards the object location 193b during playback. In addition, the playback device may ensure that the radiation pattern remains oriented towards the audio object B as either audio object moves within the 3D scene during spatial audio rendering of the sound program. Thus, the metadata 194 uses an object identifier as a proxy for the look direction point.

FIG. 15c shows an example of look direction lock metadata for fixing the look direction upon a point based on multiple objects within the 3D scene. As described herein, a look direction may be locked to a point within a region surrounded by audio objects. In particular, the authoring device 600 may be configured to determine the point, and then provide metadata to the playback device. In this figure, the authoring device may provide a group of references to the audio objects at different locations within the 3D scene, such that the playback device may determine the point towards which the look direction is to be locked. Specifically, the look direction lock metadata 194 includes references 196 to several audio objects, object B metadata 190b that includes the audio object B's location 193b through object N 190n that includes that object's location 193n. In one aspect, each of the objects B-N may be determined based on user input and/or an analysis of the media program, as described herein. In another aspect, the objects may be determined based on a user selection of a point surrounded by a region bounded by the objects. The playback device may be configured to determine the point towards which the look direction is directed based on a region surrounded by the object locations 193b-193n, as described herein (e.g., pointed towards a centroid).

In one aspect, the authoring device 600 may be configured to update at least some of the metadata and provide the updated metadata to the playback device. For instance, in the case of FIG. 15a, if the look direction location 195 were associated with a moving object (e.g., a car), upon determining that the car has moved, the authoring device may adjust the look direction location 195 and provide the updated metadata to the playback device. In contrast, when the look direction lock metadata includes references to audio objects, when those objects move, the authoring device may not need to retransmit or update the look direction metadata. For instance, in the case of FIG. 15b, if audio object B were to move, the authoring device may be configured to update the object location 193b and provide the updated metadata to the playback device. In another aspect, the reference of the look direction lock metadata may be adjusted based on changes to the look direction of an object, which may occur during playback of the media program.

As described herein, the authoring device may provide metadata that includes a location at which the playback device directs a radiation pattern of an audio object during spatial rendering. In one aspect, the metadata 194 may include one or more angular offsets (e.g., in quaternions or angular parameters, such as azimuth and elevation) which when applied by the playback device may cause the look direction of the radiation pattern to remain offset from the location referenced by the metadata 194. As a result, the radiation pattern may remain offset from the location indicated by the look direction lock metadata as the location, or the audio object moves within the 3D scene. In the case of the audio object being a sound source of a first avatar of a first user within an XR environment, and the location being a second avatar of a second user, the offset may ensure that the radiation pattern is directed upwards and towards the second avatar's face instead of the second avatar's body, which may be where the location is selected. As a result, the offset provides some objects with one or more different 3D rotations that may be useful in terms of facing a point.

FIG. 16 is a flowchart of one aspect of a process 180 at the playback device 133 for decoding metadata that instructs the decoding side to direct the radiation pattern of the audio object towards a point within the 3D scene during playback of the sound program. The process 180 begins with the playback device receiving a bitstream that includes an encoded audio object of a sound program and/or associated metadata (at block 181). In one aspect, the associated metadata may include audio object metadata which instructs the decoding side how to spatially render the audio object, as described herein. The playback device decodes the audio object of a sound program from the bitstream (at block 182). The playback device receives metadata of the sound program, the metadata instructs the decoding side to lock a look direction of a radiation pattern of the audio object towards a point within a 3D scene of the sound program as the point or the audio object moves during playback of the sound program (at block 183). In one aspect, the metadata may be received within the bitstream and decoded from the bitstream, or may be received separately. The metadata may include a look direction lock metadata structure and an audio object metadata structure, as described in FIGS. 15*a*-15*c*. In which case, the audio object metadata structure may include a reference to the look direction metadata, where the decoding side may be configured to lock the look direction of the radiation pattern of the audio object responsive to receiving the audio object metadata.

The playback device 133 determines whether the received metadata references a group of audio objects (at decision block 184). Specifically, the playback device may determine whether the look direction lock metadata 194 includes references 196 to two or more objects within the 3D scene, as shown in FIG. 15*c*. If so, the playback device determines the location of the point at which to lock the look direction based on the locations of the group of audio objects within the 3D scene (at block 186). In particular, the playback device may be configured to determine locations of the objects based on the references within the look direction lock metadata. The playback device may determine a location of a point within the 3D scene based on the locations. For example, the playback device may identify an area within the 3D scene that may be bounded by the locations of the referenced objects and may select a location within the region. In one aspect, the location within the area may be a centroid of the identified area. In one aspect, the referenced objects may be audio objects (sound sources) within the 3D scene, or may be visual objects within the 3D scene, or a combination thereof. If, however, the metadata does not reference a group of objects, the playback device determines the location of the point within the 3D scene based on the metadata (at block 185). In particular, the playback device may determine the location based on coordinates within the look direction lock metadata, or may determine the location as a location of another audio object based on the look direction lock metadata including a reference to that audio object.

The playback device 133 determines the look direction (e.g., as one or more orientation parameters) of the radiation pattern of the audio object from a location of the audio object to the location of the point within the 3D scene (at block 187). In particular, the playback device may determine one or more orientation parameters that define a direction (e.g., as yaw, pitch, and roll) with respect to a coordinate system from the location of the audio object to the location of the point the locations with respect to a reference point, based on received positional data of the audio object that may include a scene graph that includes the origin and the location of the audio object.

The playback device 133 determines the listener position (at block 188). For instance, the listener position may be determined through based on sensor data captured by one or more sensors, such as a inertial measurement unit of an electronic device worn by the listener (e.g., a head-mounted device). In another aspect, the listener position may be fixed within the 3D scene, or may be capable of movement within the 3D scene. The listener position may be determined with respect to a reference point within the 3D scene, such as a global origin (to which the location of the audio object may also reference). The playback device spatially renders the audio object based on the listener position and the look direction of the radiation pattern (at block 189). In particular, the playback device may spatially render the sound program that includes the audio object using the one or more orientation parameters associated with the look direction and according to the listener position to produce one or more spatially rendered audio signals, which may be used to drive one or more speakers.

In one aspect, for audio content that allows the listener position to change within the 3D scene, such as six degrees of freedom content, the listener position may move through the 3D scene. In which case, some radiation patterns may be intended to always face the listener. In this case, the look direction lock reference of the audio object may reference the listener position, and the playback device may be configured to calculate the look direction of the radiation pattern orientation based on the current listener location in the 3D scene, and may be configured to spatially render the sound source according to the (orientation parameters associated with the) listener position.

The playback device 133 determines whether the point and/or the audio object has moved within the 3D scene (at decision block 700). For instance, the playback device may receive updated positional data from the authoring device that indicates that the location of the audio object has moved from its previous location to a new location within the 3D scene. This may be the case when the audio object is associated with a talking person that is walking from one place in a room to another. If so, the playback device updates the look direction to maintain the radiation pattern directed towards the point (at block 701). To do this, the playback device may adjust at least one of the orientation parameters to account for the change in the audio object's position. As a result, when the point changes dynamically, the location metadata (e.g., location 195 in the look direction lock metadata 194 or the object location 193*b* in the audio object B metadata 190*b* as shown in FIGS. 15*a* and 15*b*, for example) may be updated accordingly in the bitstream that the playback device receives.

In one aspect, the playback device may adjust the look direction over a period of time. As an example, the playback device may receive additional metadata indicating that the audio object B has moved from its original location towards which the radiation pattern is locked to a new location within the 3D scene. To avoid audible artifacts when the look direction's location receives a sudden large change (e.g., audio object B moving quickly from its original location to the new location within a short period of time), the playback device may move the look direction of the radiation pattern from the original location of audio object B to its new location over a period of time. For instance, the decoding side may determine an angle (or one or more angles) between the original location of the audio object B and its new location with respect to the location of the audio object A within the 3D scene. The playback device may move the look direction by rotating the look direction along the angle about the location of the audio object at a velocity based on the period of time. As a result, the playback device may generate different orientation parameters at given intervals of that period of time along the angle and may spatially render the sound program using the newly generated parameters. In one aspect, the playback device may interpolate between the current location and the updated one to modify the look direction of the radiation pattern in multiple small angle increments along a smooth trajectory of the angle. In another aspect, this interpolation may also apply when the audio object having the radiation pattern moves with respect to the location towards which its radiation pattern's look direction is locked. As a result, by having the playback device interpolate between the two locations, the bitrate of the bitstream may be reduced, while providing a smooth trajectory between the two locations.

The playback device may limit movement of the look direction when the point towards which the look direction is orientated changes. For example, the look direction lock metadata may be updated to reference a new point. This may be the case when the look direction of the sound sources changes, such as changing from being directed towards staff of a coat checkout to a horizon. As a result, the playback device may receive updated look direction lock metadata, and responsive to receiving the updated payload may move the look direction from its original point to the new point over a period of time, as describe herein, so as to limit audible artifacts during playback.

Figure 17:
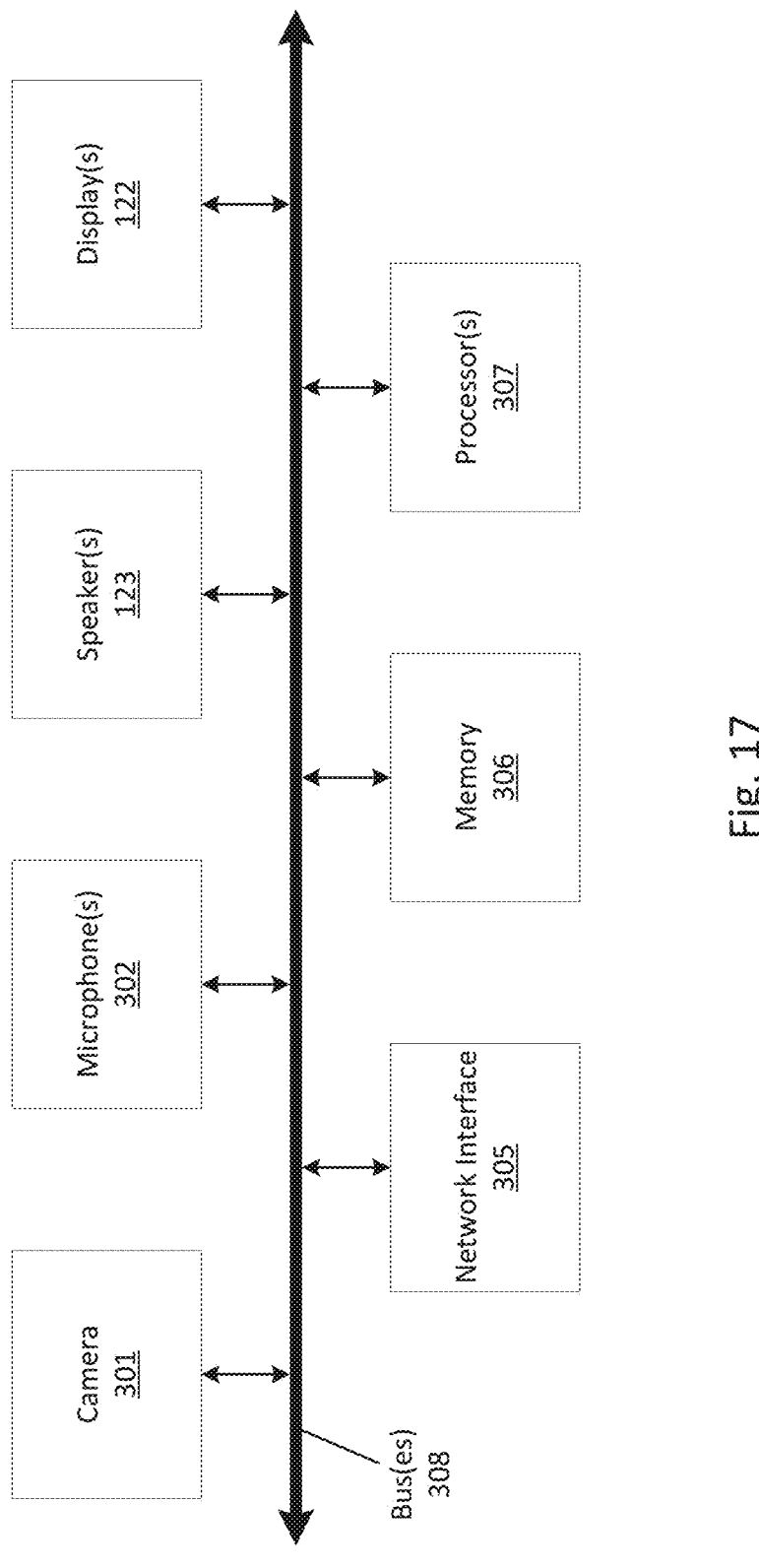
FIG. 17 illustrates an example of system hardware.

FIG. 17 shows a block diagram of audio processing system hardware (e.g., of the authoring device 600 and/or the playback device 133 of system 100), in one aspect, which may be used with any of the aspects described herein. This audio processing system may represent a general-purpose computer system or a special purpose computer system. Note that while FIG. 17 illustrates the various components of an audio processing system that may be incorporated into one or more of the devices described herein, it is merely one example of a particular implementation and is merely to illustrate the types of components that may be present in the system. FIG. 17 is not intended to represent any particular architecture or manner of interconnecting the components as such details are not germane to the aspects herein. It will also be appreciated that other types of audio processing systems that have fewer components than shown or more components than shown in FIG. 17 can also be used. Accordingly, the processes described herein are not limited to use with the hardware and software of FIG. 17.

As shown in FIG. 17, the audio processing system (or system) 300 (for example, a laptop computer, a desktop computer, a mobile phone, a smart phone, a tablet computer, a smart speaker, a head mounted display (HMD), a headphone (headset), or an infotainment system for an automobile or other vehicle) includes one or more buses 308 that serve to interconnect the various components of the system. One or more processors 307 are coupled to bus 308 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 306 can include Read Only Memory (ROM), volatile memory, and non-volatile memory, or combinations thereof, coupled to the bus using techniques known in the art. Camera 301, microphone(s) 302, speaker(s) 123, and display(s) 122 may be coupled to the bus.

Memory 306 can be connected to the bus and can include DRAM, a hard disk drive or a flash memory or a magnetic optical drive or magnetic memory or an optical drive or other types of memory systems that maintain data even after power is removed from the system. In one aspect, the processor 307 retrieves computer program instructions stored in a machine-readable storage medium (memory) and executes those instructions to perform operations described herein.

Audio hardware, although not shown, can be coupled to the one or more buses 308 in order to receive audio signals to be processed and output by speakers 123. Audio hardware can include digital to analog and/or analog to digital converters. Audio hardware can also include audio amplifiers and filters. The audio hardware can also interface with microphones 302 (e.g., microphone arrays) to receive audio signals (whether analog or digital), and communicate the signals to the bus 308.

The network interface 305 may communicate with one or more remote devices and networks. For example, interface can communicate over known technologies such as Wi-Fi, 3G, 4G, 5G, Bluetooth, ZigBee, or other equivalent technologies. The interface can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 308 can be connected to each other through various bridges, controllers and/or adapters as is well known in the art. In one aspect, one or more network device(s) can be coupled to the bus 308. The network device(s) can be wired network devices (e.g., Ethernet) or wireless network devices (e.g., WI-FI, Bluetooth). In some aspects, various aspects described can be performed by a networked server in communication with one or more devices.

Various aspects described herein may be embodied, at least in part, in software. That is, the techniques described above may be carried out in an audio processing system in response to its processor executing instructions contained in a storage medium, such as a non-transitory machine-readable storage medium (e.g., dynamic random access memory, static memory, non-volatile memory). Note the phrase "a processor" is used generically here to refer to one or more processors that may be in separate housings or devices and that may be in communication with each other, for example forming in effect a distributed computing system. Also, in various aspects, hardwired circuitry may be used in combination with software instructions to implement the techniques described herein. Thus, the techniques are not limited to any specific combination of hardware circuitry and software, or to any source for the instructions executed by the audio processing system.

In the description, certain terminology is used to describe features of various aspects. For example, in certain situations, the terms "module", "processor", "unit", "renderer", "system", "device", "filter", "engine", "block," "detector," "simulation," "model," "identifier," "lock," and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In one aspect, the sound source of the look direction may include an avatar of a user within the 3D acoustic environment (e.g., an XR environment), and the orientation that is being lock may be a front-facing direction of the avatar. In one aspect, the motion of the point (location) may include a movement of a second audio object from a location to a new location within the 3D environment, where the one or more parameters are updated such that the look direction of the first audio object follows the second audio object from the location to the new location. In another aspect, the look direction of the first audio object follows the second audio object such that the radiation pattern rotates along at least one axis of the first audio object as the look direction follows the second audio object. In some aspects, the sound program and metadata that includes updated orientation parameters may be encoded into a bitstream for transmission to one or more playback devices.

According to one aspect of the disclosure includes a method by an encoding side, the method including: encoding a sound program into a bitstream, the sound program having an audio object within a 3D scene; and encoding metadata of the sound program into the bitstream, the metadata indicating a location within the 3D scene towards which a radiation pattern of the audio object is to remain oriented as the location or the audio object moves within the 3D scene during spatial audio rendering of the sound program.

In one aspect, the metadata includes several coordinates of the location, the coordinates are of a coordinate system with respect to an origin of the 3D scene. In another aspect, the audio object is a first audio object, the metadata includes a reference to a second audio object at the location within the 3D scene such that the radiation pattern is to remain oriented towards the second audio object as either audio object moves within the 3D scene during spatial audio rendering of the sound program. In another aspect, the metadata includes several references to several audio objects at different locations within the 3D scene, the location is based on the locations. In some aspects, the location is a centroid of a region within the 3D scene that is bounded by the locations of the audio objects. In another aspect, encoding metadata includes adding audio object metadata that includes a reference to the metadata that instructs a decoding side process to lock a direction of the radiation pattern onto the location during spatial audio rendering of the sound program. In one aspect, the metadata further includes one or more angular offsets which cause a look direction of the radiation pattern to remain offset from the location as the location or the audio object moves within the 3D scene during spatial rendering of the sound program.

In one aspect, a location based on several objects may be a centroid of an area within the 3D scene that is bounded by the locations of the audio objects. In another aspect, metadata may be look direction metadata, where the playback device may receive audio object metadata that includes a reference to the look direction metadata, where the playback device may lock the look direction of the radiation pattern responsive to receiving the audio object metadata.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the claim.

It is well understood that the use of personally identifiable information should follow privacy policies and practices that are recognized as meeting or exceeding industry or governmental requirements for maintaining the privacy of users. Personally identifiable information data should be managed and handled to minimize risks of unintentional or unauthorized access or use, and the nature of authorized use should be clearly indicated to users.

What is claimed is:

1. A method comprising:

displaying a user interface (UI) of a three-dimensional (3D) acoustic environment that includes a sound source;

receiving a first user selection, via an input device, of a location within the UI, the location towards which the sound source is to be oriented within the 3D acoustic environment;

receiving a second user selection through the input device of a UI item that locks an orientation of the sound source with the location;

determining, responsive to the receiving of the second user selection, a set of parameters that define the orientation of the sound source towards the location within the 3D acoustic environment;

determining that there is motion of the location or the sound source within the 3D acoustic environment; and updating, without user intervention and based on the motion, the set of parameters to maintain the orientation of the sound source towards the location.

2. The method of claim 1, wherein the sound source is a first sound source, and the location is one of:

a static location within the 3D acoustic environment, a second sound source within the 3D acoustic environment, or a point within a region surrounded by a plurality of sound sources within the 3D acoustic environment.

3. The method of claim 2, wherein the motion of the location comprises a movement of the second sound source from the location to a new location within the 3D acoustic environment, wherein the set of parameters are updated such that the orientation of the first sound source follows the second sound source from the location to the new location.

4. The method of claim 1, wherein the sound source comprises a radiation pattern for sound of the sound source, wherein the orientation is a look direction the radiation pattern from the sound source and towards the location.

5. The method of claim 1 further comprising fixing the orientation of the sound source towards the location responsive to receiving the second user selection such that regardless of the motion of the location or the sound source, the orientation of the sound source remains directed towards the location.

6. The method of claim 1 further comprising:

encoding the sound source into a bitstream for transmission to a playback device; and providing metadata that includes the set of parameters, wherein the playback device is to be configured to render the sound source according to the set of parameters.

7. The method of claim 6 further comprising, subsequent to providing the metadata, providing the updated set of parameters such that the playback device is configured to adjust the orientation of the sound source during rendering of the sound source.

8. The method of claim 6, wherein the sound source is a part of a live audio broadcast.

9. An electronic device comprising:

at least one processor; and memory having instructions stored therein which when executed by the at least one processor causes the electronic device to:

36 receive an audio object of a sound program, the audio object comprising a radiation pattern for projecting sound towards a look direction of the audio object within a three-dimensional (3D) scene;

assign a point within the 3D scene of which the look direction of the audio object is to be directed towards;

receive a user selection of an item for locking the look direction;

determine, responsive to a reception of the user selection, one or more orientation parameters for the look direction of the audio object;

determine whether there is motion of the point or of the audio object within the 3D scene; and responsive to a determination that there is motion of the point or of the audio object, update, based on the motion and without user intervention, the one or more orientation parameters to maintain the look direction directed towards the point.

10. The electronic device of claim 9, wherein the user selection is a first user selection, wherein the electronic device further comprises a display, wherein the memory has further instructions to display a user interface (UI) of the 3D scene on the display, wherein the instructions to assign the point comprises instructions to receive, through an input device, a second user selection of the point within the UI, wherein the item is a UI item within the UI.

11. The electronic device of claim 9, wherein the audio object is a first audio object, wherein the point is one of:

a static location with respect to an origin within the 3D scene, a second audio object within the 3D scene, or a location within a region surrounded by a plurality of audio objects within the 3D scene.

12. The electronic device of claim 11, wherein the location is a centroid of the region.

13. The electronic device of claim 9, wherein the sound program is a live audio broadcast.

14. The electronic device of claim 9, wherein the sound program is a live audio communication between the electronic device and a playback device.

15. A method comprising:

decoding an audio object of a sound program from a bitstream;

receiving metadata of the sound program, wherein the metadata instructs a decoding side to lock a look direction of a radiation pattern of the audio object towards a point within a three-dimensional (3D) scene as the point or the audio object moves during playback of the sound program;

determining a listener location within the 3D scene, wherein the point is to be at the listener location;

determining one or more orientation parameters for the look direction of the radiation pattern to be orientated towards the listener location;

producing a set of spatially rendered audio signals by spatially rendering the sound program according to the one or more orientation parameters; and using the set of spatially rendered audio signals to drive a set of speakers to playback the sound program.

16. The method of claim 15, wherein the point is a first point, the look direction is a first look direction, the radiation pattern is a first radiation pattern, and the audio object is a first audio object, wherein the metadata further instructs the decoding side to lock a second look direction of a second radiation pattern of a second audio object towards a second point within the 3D scene.

17. The method of claim 16, wherein the second point is at a location of the first audio object within the 3D scene.

18. The method of claim 16, wherein the metadata comprises a plurality of references to a plurality of audio objects within the 3D scene, wherein the method further comprises:

determining locations of the plurality of audio objects based on the plurality of references;

determining a location of the second point within an area bounded by the locations of the plurality of audio objects; and determining the second look direction of the second radiation pattern of the second audio object from a location of the second audio object to the location of the second point within the 3D scene.

19. The method of claim 15, wherein the audio object is at a first location within the 3D scene, wherein the method further comprises:

determining that the audio object has moved to a second location or that the listener location has moved to a new listener location within the 3D scene; and moving the look direction of the radiation pattern from the first location to the second location or from the listener location to the new listener location over a period of time.

20. The method of claim 19 further comprising determining an angle between either the first location and the second location with respect to the listener location or the listener location and the new listener location with respect to the first location within the 3D scene, wherein moving the look direction comprises rotating the look direction along the angle at a velocity based on the period of time.

21. The method of claim 15, wherein the metadata further comprises one or more angular offsets, wherein the method further comprises spatially rendering the audio object such that the look direction of the radiation pattern is offset from the point based on the one or more angular offsets.

22. The method of claim 15, wherein the sound program is a live audio broadcast.

* * * * *